(12) United States Patent
Lee et al.

(10) Patent No.: US 11,540,098 B2
(45) Date of Patent: Dec. 27, 2022

(54) DISTANCE MEASUREMENT METHOD OF USER EQUIPMENT IN WIRELESS COMMUNICATION SYSTEM AND USER EQUIPMENT USING METHOD

(71) Applicant: LG Electronics Inc., Seoul (KR)

(72) Inventors: Seungmin Lee, Seoul (KR); Hanbyul Seo, Seoul (KR); Hyukjin Chae, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 16/761,564

(22) PCT Filed: Nov. 8, 2018

(86) PCT No.: PCT/KR2018/013554
§ 371 (c)(1),
(2) Date: May 5, 2020

(87) PCT Pub. No.: WO2019/093791
PCT Pub. Date: May 16, 2019

(65) Prior Publication Data
US 2020/0275244 A1 Aug. 27, 2020

Related U.S. Application Data

(60) Provisional application No. 62/583,419, filed on Nov. 8, 2017.

(51) Int. Cl.
*H04W 4/40* (2018.01)
*H04W 72/02* (2009.01)
(Continued)

(52) U.S. Cl.
CPC ............ *H04W 4/40* (2018.02); *G01S 3/043* (2013.01); *G01S 5/0072* (2013.01);
(Continued)

(58) Field of Classification Search
CPC ........ G01S 11/02; G01S 11/026; G01S 11/08; G01S 11/10; G01S 3/043; G01S 5/0072;
(Continued)

(56) References Cited

U.S. PATENT DOCUMENTS

2010/0150100 A1* 6/2010 Chen .................... H04L 5/0007
370/329
2013/0242875 A1 9/2013 Abraham et al.
(Continued)

FOREIGN PATENT DOCUMENTS

EP 2852231 A1 3/2015
KR 10-2015-0026090 3/2015
(Continued)

OTHER PUBLICATIONS

Clarivate Analytics, "WO 2009136732 A2," 2022 (Year: 2022).*

*Primary Examiner* — Maharishi V Khirodhar
*Assistant Examiner* — Kenneth P Hunt
(74) *Attorney, Agent, or Firm* — Dentons US LLP

(57) ABSTRACT

The present document provides a method by which first vehicle-to-X (V2X) user equipment (UE) for supporting distance measurement transmits a ranging response signal in a wireless communication system, the method comprising: receiving a ranging request signal from second V2X UE; and transmitting, to the second V2X UE, the ranging response signal as a response to the ranging request signal on the basis of distance measurement parameter information, wherein the distance measurement parameter information includes information on a cyclic prefix (CP) length used for the ranging response signal, and the CP length used for the ranging response signal is different from a CP length to be used in V2X data channel transmission.

13 Claims, 32 Drawing Sheets

(51) Int. Cl.
| | |
|---|---|
| *H04L 27/26* | (2006.01) |
| *H04W 64/00* | (2009.01) |
| *H04W 4/029* | (2018.01) |
| *H04W 72/04* | (2009.01) |
| *H04W 84/18* | (2009.01) |
| *G01S 3/04* | (2006.01) |
| *G01S 5/02* | (2010.01) |
| *G01S 13/87* | (2006.01) |
| *G01S 5/00* | (2006.01) |
| *G01S 13/75* | (2006.01) |
| *G01S 13/84* | (2006.01) |

(52) U.S. Cl.
CPC .......... *G01S 5/0284* (2013.01); *G01S 13/756* (2013.01); *G01S 13/84* (2013.01); *G01S 13/876* (2013.01); *H04L 27/2607* (2013.01); *H04W 4/029* (2018.02); *H04W 64/003* (2013.01); *H04W 72/02* (2013.01); *H04W 72/042* (2013.01); *H04W 84/18* (2013.01)

(58) Field of Classification Search
CPC ...... G01S 5/0284; G01S 13/84; G01S 13/765; G01S 2205/01; H04W 84/18; H04W 64/003; H04W 72/042; H04W 72/02; H04W 4/029; H04W 4/40; H04W 4/44; H04W 4/70; H04W 4/46; H04W 76/14; H04W 4/02; H04W 4/80; H04W 92/18; H04L 27/2607

USPC ....................................................... 701/330
See application file for complete search history.

(56) References Cited

U.S. PATENT DOCUMENTS

| | | |
|---|---|---|
| 2017/0026798 A1 | 1/2017 | Prevatt |
| 2017/0041926 A1 | 2/2017 | Qi et al. |
| 2017/0215131 A1 | 7/2017 | Qi et al. |
| 2019/0036739 A1* | 1/2019 | Lindskog .............. H04L 5/0055 |
| 2021/0286045 A1* | 9/2021 | Bayesteh .................. H04L 5/14 |

FOREIGN PATENT DOCUMENTS

| | | | |
|---|---|---|---|
| WO | WO-2009136732 A2 * | 11/2009 | ........... H04J 3/0682 |
| WO | 2017-105154 | 6/2017 | |

* cited by examiner

FIG. 7
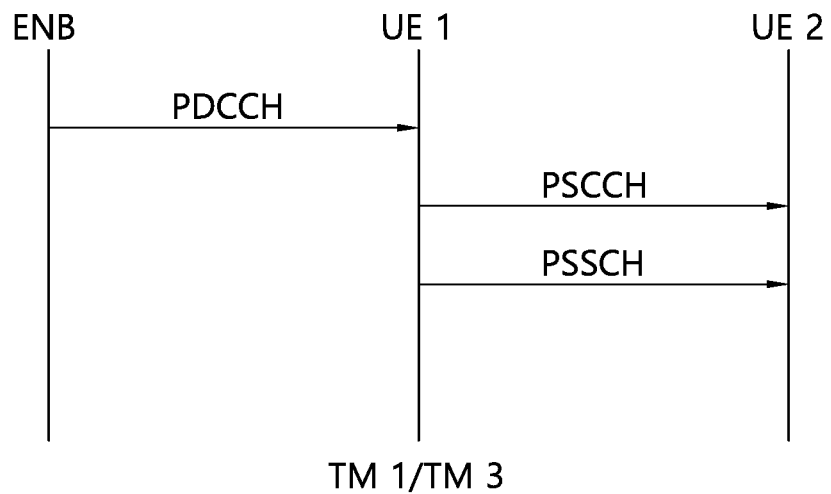
(a)
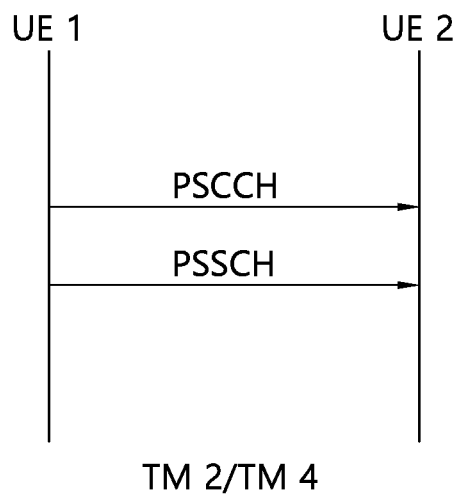
(b)

DISTANCE MEASUREMENT METHOD OF USER EQUIPMENT IN WIRELESS COMMUNICATION SYSTEM AND USER EQUIPMENT USING METHOD

This application is the National Stage filing under 35 U.S.C. 371 of International Application No. PCT/KR2018/013554, filed on Nov. 8, 2018, which claims the benefit of U.S. Provisional Application No. 62/583,419 filed on Nov. 8, 2017, the contents of which are all hereby incorporated by reference herein in their entirety.

BACKGROUND OF THE DISCLOSURE

Field of the Disclosure

The present disclosure relates to wireless communication, and more particularly, to a method of measuring a distance of a terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, the interest in device-to-device (D2D) technology for direct communication between devices is increasing. In particular, the D2D is drawing attention as a communication technology for a public safety network. Commercial communication networks are rapidly changing to LTE, but current public safety networks are mainly based on 2G technology in terms of conflict and cost with the existing communication standards. The technical gap and the need for improved services are leading to efforts to improve the public safety networks.

In V2X communication, there is a need to provide a method in which a terminal (e.g., V2X terminal) measures a distance to another terminal (e.g., V2X terminal).

Accordingly, the present disclosure provides a method of efficiently performing (sensing based) (transmission) resource selection/operation related to distance measurement signals between wireless communication devices and a device using the same.

SUMMARY OF THE DISCLOSURE

The present disclosure provides a method of measuring a distance of a terminal in a wireless communication system and a terminal using the method.

In an aspect, a method of transmitting a ranging response signal performed by a first vehicle-to-X (V2X) user equipment (UE) for supporting distance measurement in a wireless communication system is provided. The method may comprise receiving a ranging request signal from a second V2X UE and transmitting a ranging response signal to the second V2X UE in response to the ranging request signal based on distance measurement parameter information, wherein the distance measurement parameter information comprises information about a cyclic prefix (CP) length used for the ranging response signal, and the CP length used for the ranging response signal is different from a CP length used for V2X data channel transmission.

A phase based on the ranging request signal and the ranging response signal may be used, when the distance measurement is performed.

The distance measurement parameter information may comprise at least one of sensing operation related information, transmission power related information, resource pool related information, or congestion control based link adaption related information.

The distance measurement parameter information may be transmitted from a base station through predefined signaling.

The distance measurement parameter information may be determined by the first UE based on a predefined rule.

The first V2X UE may determine a transmission resource related to transmission of the ranging response signal and transmits the ranging response signal to the second V2X UE based on the determined transmission resource.

The first V2X UE may determine the transmission resource among resources except for a resource to which the ranging request signal is transmitted.

The first V2X UE may select a resource having relatively less interference as the transmission resource based on sensing.

Information about the resource to which the ranging request signal may be transmitted is included in the ranging request signal.

The first V2X UE may reselect the transmission resource based on whether a transmission resource reselection condition is satisfied.

The ranging request signal may comprise at least one of information on an ID of the second V2X UE, application ID information, or location information of the second V2X UE.

In another aspect, a first vehicle-to-X (V2X) user equipment (UE) for supporting distance measurement in a wireless communication system is provided. The first V2X UE may comprise a transceiver configured to transmit and receive wireless signals and a processor configured to control the transceiver, wherein the processor is configured to: receive a ranging request signal from a second V2X UE and transmit a ranging response signal to the second V2X UE in response to the ranging request signal based on distance measurement parameter information, wherein the distance measurement parameter information comprises information about a cyclic prefix (CP) length used for the ranging response signal, and the CP length used for the ranging response signal is different from a CP length used for V2X data channel transmission.

According to the present document, the transmission and reception of the ranging request signal and the ranging response signal can be accurately performed as quickly as possible, the transmission/reception of the ranging request signal and the ranging response signal can be accurately performed within the shortest possible time, thereby making the phase difference accurate. Accordingly, the terminal (which has transmitted the ranging request signal) can measure the distance based on the correct phase difference, and the terminal can perform accurate distance measurement with other terminals.

BRIEF DESCRIPTION OF THE DRAWINGS

FIG. 7 illustrates a UE operation according to a transmission mode (TM) related to V2X/D2D.

DESCRIPTION OF EXEMPLARY EMBODIMENTS

Hereinafter, terms or abbreviations that are not separately defined may be defined in 3GPP TS 36 series or TS 38 series.

Figure 1:
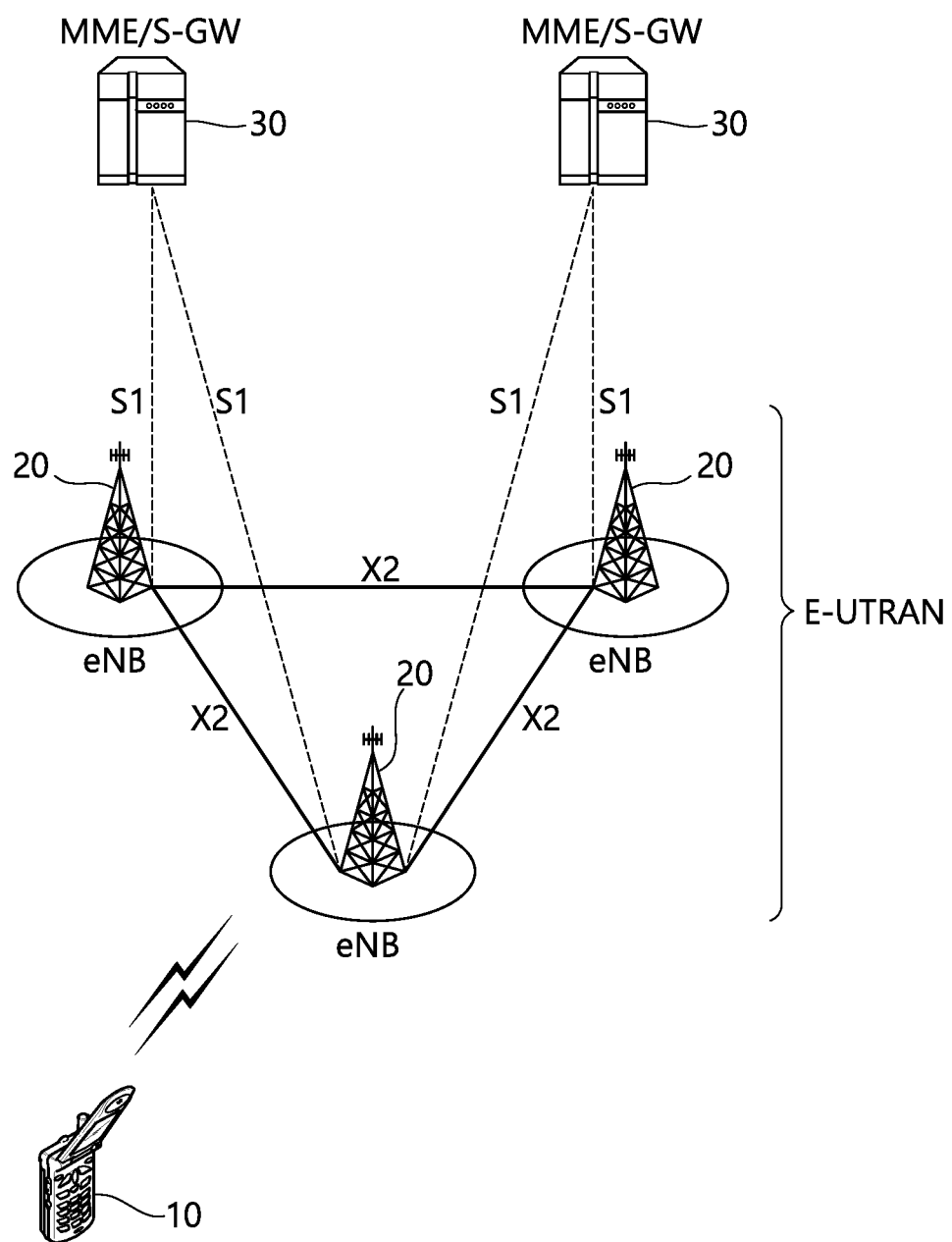
FIG. 1 illustrates a wireless communication system.

FIG. 1 illustrates a wireless communication system. This may also be called an evolved-UMTS terrestrial radio access network (E-UTRAN), or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
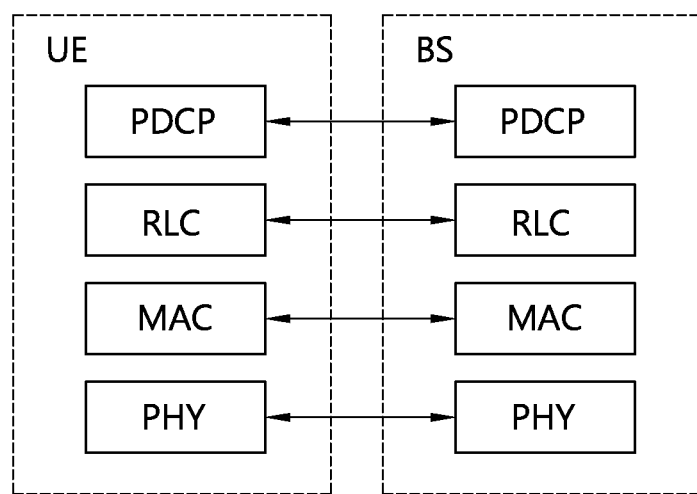
FIG. 2 is a diagram showing a wireless protocol architecture for a user plane.
Figure 3:
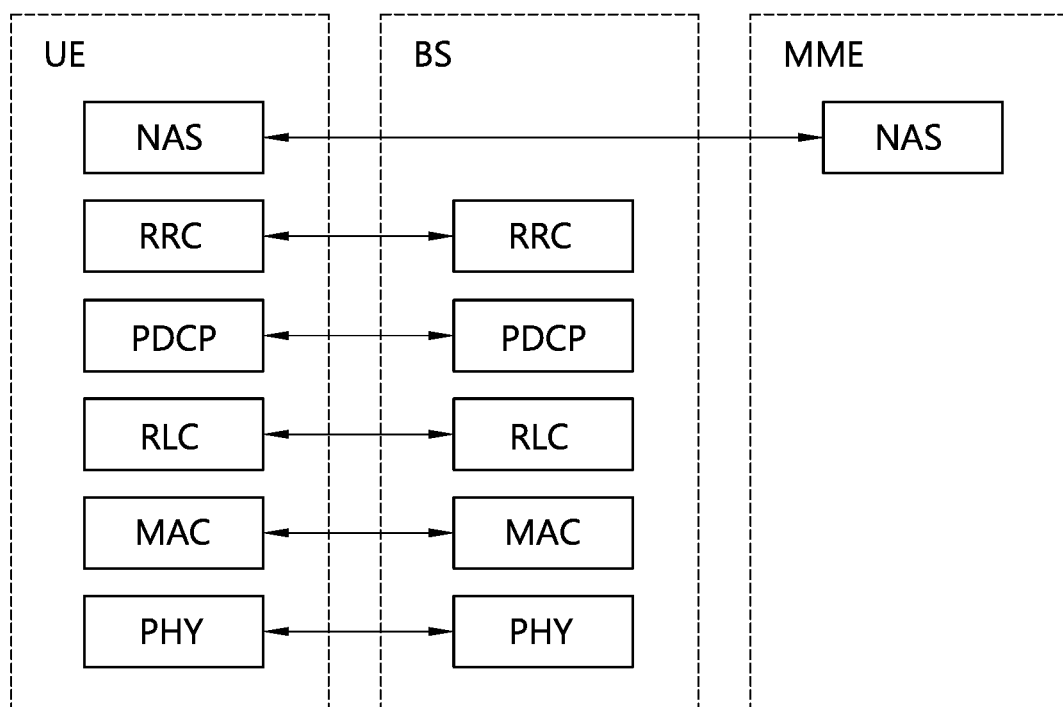
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new radio access technology may be abbreviated as new radio (NR).

As more communication devices require larger communication capacities, there is a need for improved mobile broadband communication compared to the existing radio access technology (RAT). In addition, massive machine type communications (MTC), which connects between multiple devices and objects to provide various services anytime and anywhere, is also one of the major issues to be considered in next-generation communication. In addition, communication system designs considering services/terminals that are sensitive to reliability and latency have been discussed. The introduction of the next-generation wireless access technologies in consideration of such enhanced mobile broadband communication, the massive MTC, ultra-reliable and low latency communication (URLLC), and the like, have been discussed, and in the present document, for convenience, the technology is referred to as new RAT or NR.

Figure 4:
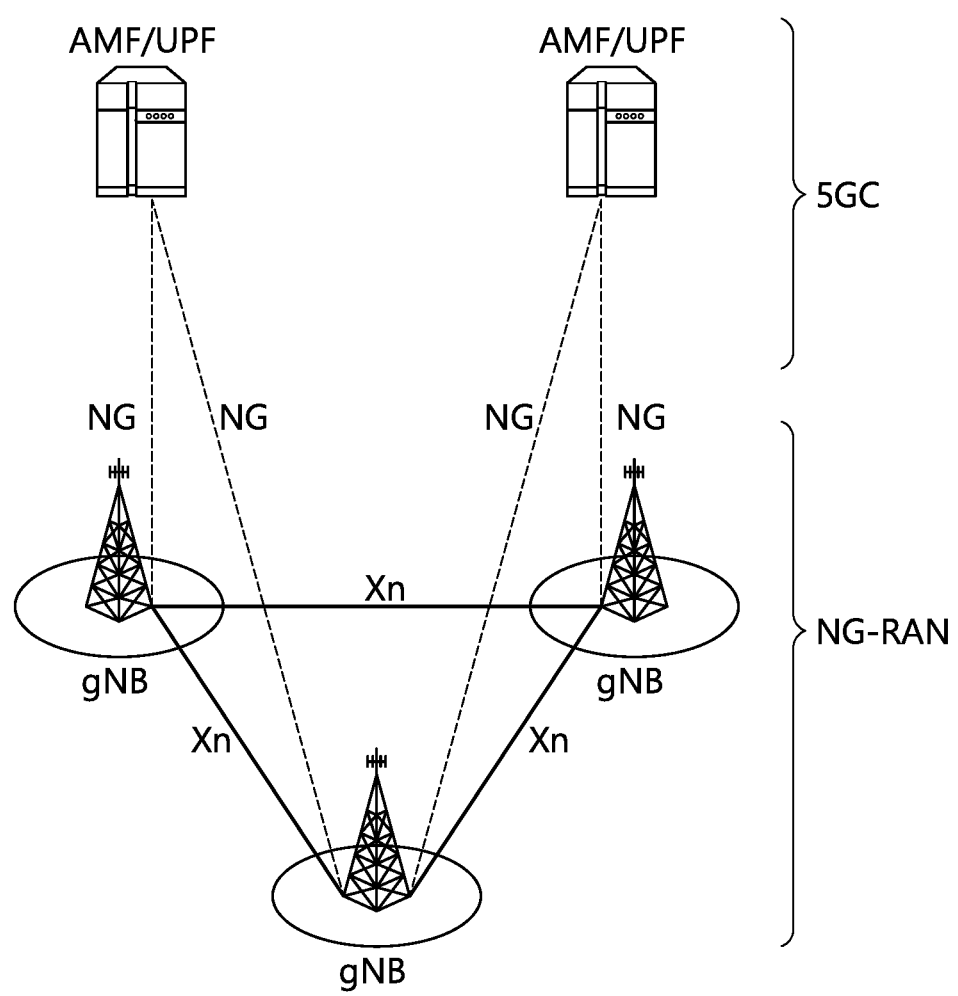
FIG. 4 illustrates a system structure of a new generation radio access network (NG-RAN) to which the NR is applied.

FIG. 4 illustrates a system structure of a new generation radio access network (NG-RAN) to which the NR is applied.

Referring to FIG. 4, the NG-RAN may include gNB and/or eNB that provides user plane and control plane protocol termination to a terminal. FIG. 4 illustrates a case of including only the gNB. The gNB and the eNB are connected to each other via an Xn interface. The gNB and the eNB are connected to a 5G core network (5GC) via an NG interface. More specifically, the gNB and the eNB are connected to an access and mobility management function (AMF) via an the NG-C interface, and are connected to a user plane function (UPF) via an NG-U interface.

Figure 5:
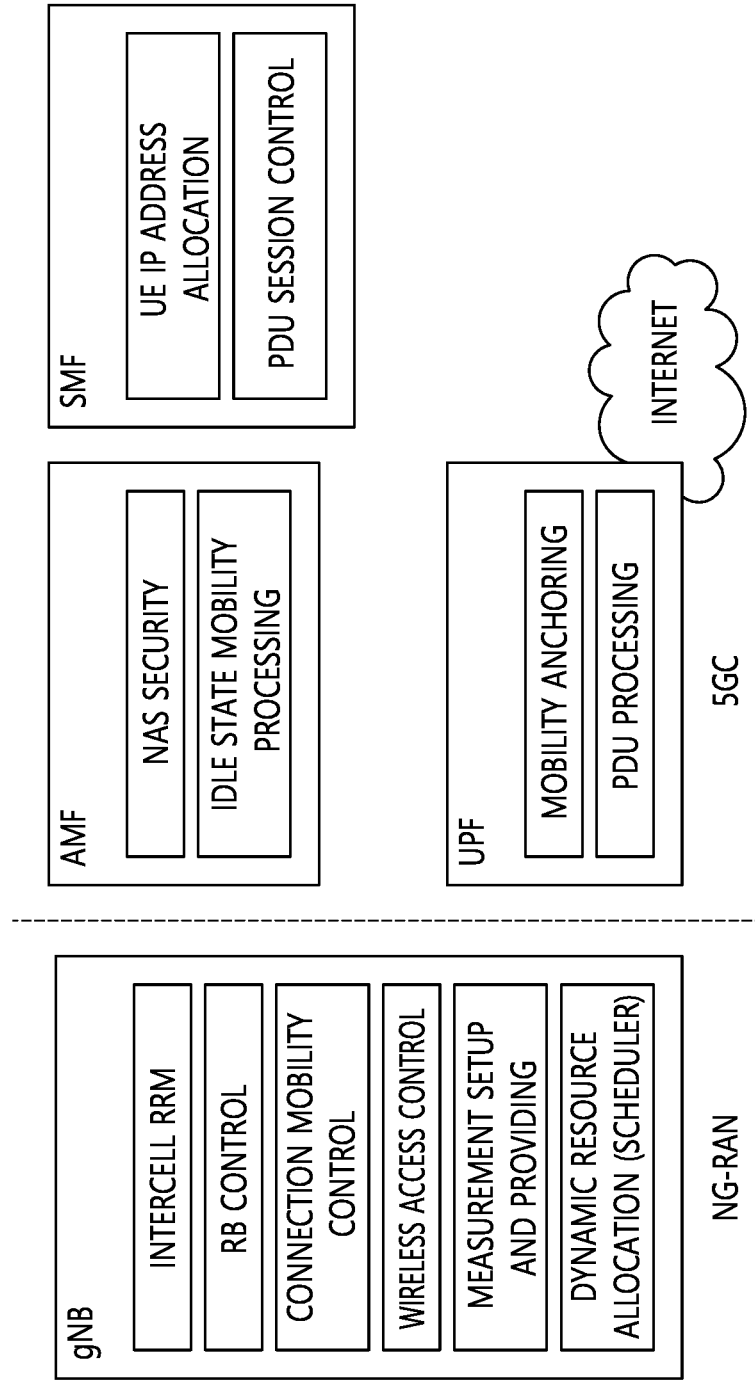
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (inter cell RRM), radio bearer management (RB control), connection mobility control, radio admission control, and measurement configuration and provision, and dynamic resource allocation. The AMF may provide functions such as NAS security and idle state mobility processing. The UPF may provide functions such as mobility anchoring and PDU processing. The session management function (SMF) may provide functions such as terminal IP address allocation and PDU session control.

Figure 6:
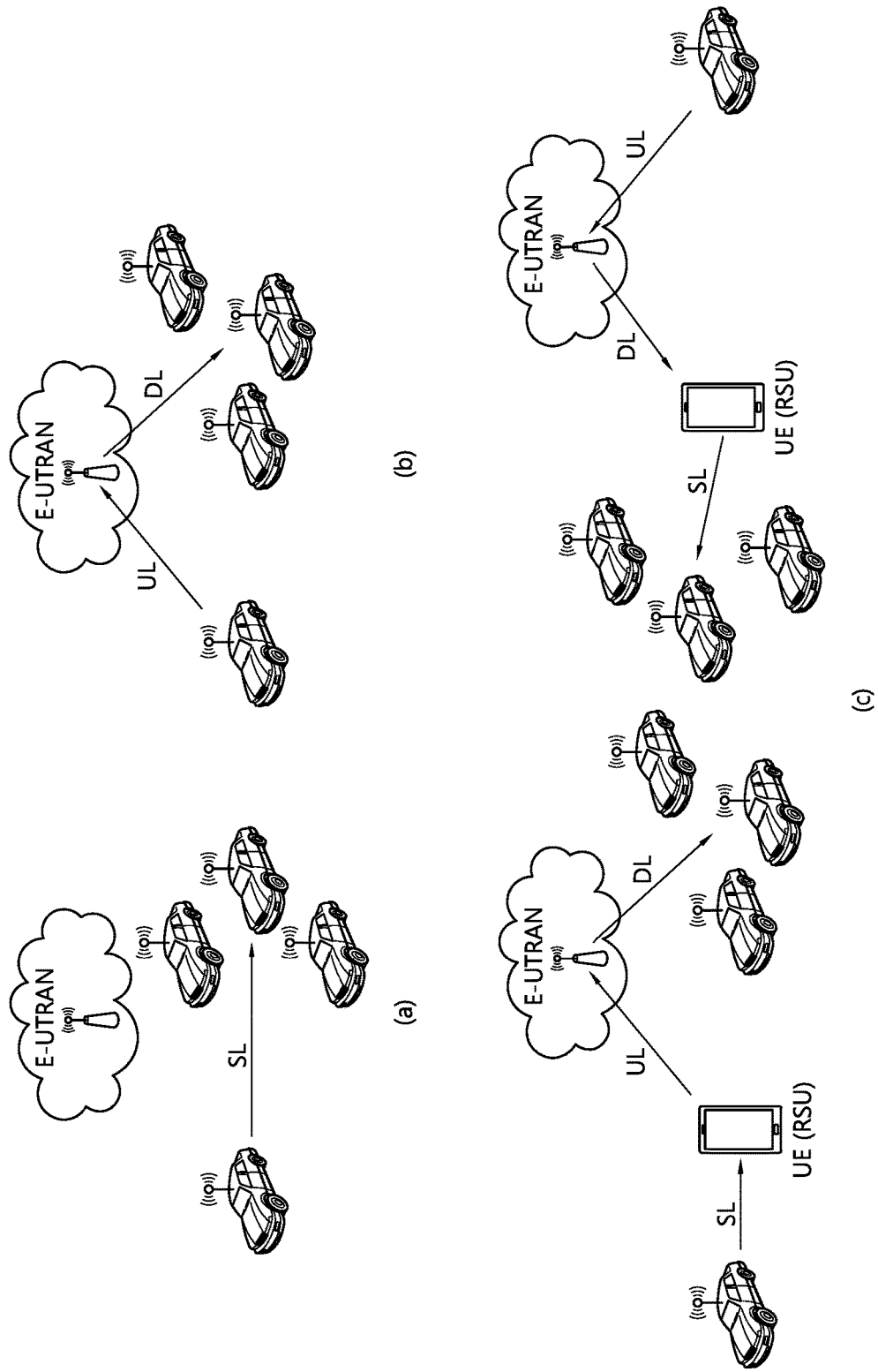
FIG. 6 illustrates scenarios for V2X communication.

FIG. 6 illustrates scenarios for V2X communication.

Referring to FIG. 6(a), V2X communication may support a PC5 based information exchange operation (between UEs), which is an interface between UEs, and as illustrated in FIG. 6(b), V2X communication may support a Uu based information exchange operation (between UEs), which is an interface between an eNodeB and a UE. Further, as illustrated in FIG. 6(c), V2X communication may support an information exchange operation (between UEs) using both PC5 and Uu.

FIG. 7 illustrates a UE operation according to a transmission mode (TM) related to V2X/D2D.

FIG. 7(a) is for transmission modes 1 and 3, and FIG. 7(b) is for transmission modes 2 and 4. In the transmission mode 1/3, the eNB performs resource scheduling through a PDCCH (more specifically, DCI) to a UE 1, and the UE 1 performs D2D/V2X communication with a UE 2 according to the resource scheduling. After transmitting sidelink control information (SCI) to the UE 2 through a physical sidelink control channel (PSCCH), the UE 1 may transmit data through a physical sidelink shared channel (PSSCH) based on the SCI. The transmission mode 1 may be applied to D2D, and the transmission mode 3 may be applied to V2X.

The transmission mode 2/4 may be a mode in which the UE schedules itself. More specifically, the transmission mode 2 is applied to D2D, and the UE may select a resource itself in a preset resource pool to perform a D2D operation. The transmission mode 4 is applied to V2X, and the UE may select a resource in a selection window via a sensing/SA decoding process and then perform a V2X operation. After transmitting the SCI to the UE 2 through a PSCCH, the UE 1 may transmit data based on the SCI through the PSSCH. Hereinafter, the transmission mode may be abbreviated as a mode.

Control information transmitted by the eNB to the UE through the PDCCH may be referred to as downlink control information (DCI), whereas control information transmitted by the UE to another UE through the PSCCH may be referred to as SCI. The SCI may deliver sidelink scheduling information. SCI may have various formats, for example, SCI format 0 and SCI format 1.

The SCI format 0 may be used for scheduling of the PSSCH. The SCI format 0 may include a frequency hopping flag (1 bit), a resource block allocation and hopping resource allocation field (the number of bits may vary according to the number of resource blocks of the sidelink), a time resource pattern (7 bits), a modulation and coding scheme (MCS, 5 bits), time advance indication (11 bits), group destination ID (8 bits), and the like.

The SCI format 1 may be used for scheduling of the PSSCH. The SCI format 1 includes a priority (3 bits), resource reservation (4 bits), a frequency resource location of initial transmission and retransmission (the number of bits may vary according to the number of sub-channels of the sidelink), a time gap between initial transmission and retransmission (4 bits), MCS (5 bits), retransmission index (1 bit), and reserved information bits. The reserved information bits may be abbreviated as reserved bits. The reserved bits may be added until a bit size of the SCI format 1 becomes 32 bits. That is, the SCI format 1 includes a plurality of fields including different information, and in the fixed total number of bits (32 bits) of the SCI format 1, bits of the remaining number except for the total number of bits of the plurality of fields may be referred to as reserved bits.

The SCI format 0 may be used for transmission modes 1 and 2, and the SCI format 1 may be used for transmission modes 3 and 4.

Hereinafter, the present disclosure will be described in detail.

<Distance Measurement Technique>

The method/apparatus in accordance with the following distance measurement techniques may be utilized in using distance, direction, and location between wireless communication systems. The following method/apparatus may be applied to the above-described V2X or may be utilized in general wireless communication. For example, it may be used to measure the distance between a particular entity (e.g., a vehicle) and another entity in a V2X system, or to measure the coordinates of a particular entity on a 3GPP network.

In the conventional 3GPP LTE system, the position was measured based on Observed Time Difference Of Arrival (OTDOA). OTDOA is a technology embodied through 3GPP Rel-9 and the like and uses at least three base stations including a serving base station. Specifically, in order to measure the location of a UE, two hyperbolic equations are generated based on Reference Signal Time Difference (RSTD) information of the base station downlink signal, and an operation for obtaining a solution of the equation is performed. However, for distance measurement based on OTDOA, time synchronization between entities transmitting signals for distance measurement should be ensured.

The distance measuring technique according to the present specification does not need to secure time synchronization of the transmitter and the receiver, as described below, and provides higher accuracy than the conventional technique. As a result, it can be applied to a V2X system requiring accurate distance measurement, and can be applied to various systems requiring precise distance measurement.

The distance measurement technique according to the present specification may include a method of measuring a distance between wireless communication devices. For example, the apparatuses (i.e., the transmitter and the receiver) that are subject to the distance measurement may measure the distance by using phase information of radio signals transmitted from each other. In the following example, a situation of transmitting and receiving a signal using two frequencies w1 and w2 has been described, but the number of frequencies used for transmission and reception may be variously determined. In addition, the examples described below assume a situation of transmitting a plurality of frequencies at the same time, but it is also possible to apply the principles of the present specification in consideration of the transmission at a different predetermined time point.

Hereinafter, a specific example of the distance measuring technique according to the present specification will be described based on equations, and then the specific technique according to the present specification will be described through generalized terms.

When observing a radio signal transmitted at a specific point with an angular frequency w at a time t at a point place away from the transmission point by x, the observed signal is expressed by the following equation.

$$E(w,t,x)=A(x)*\exp(j*(w*t-k*x+\phi))  \quad \text{[Equation 1]}$$

In the Equation, A means the amplitude (amplitude) of the radio signal at the location, k means a variable that satisfies the condition of $$k = \frac{w}{c},$$

and c means the speed of light.

Figure 8:
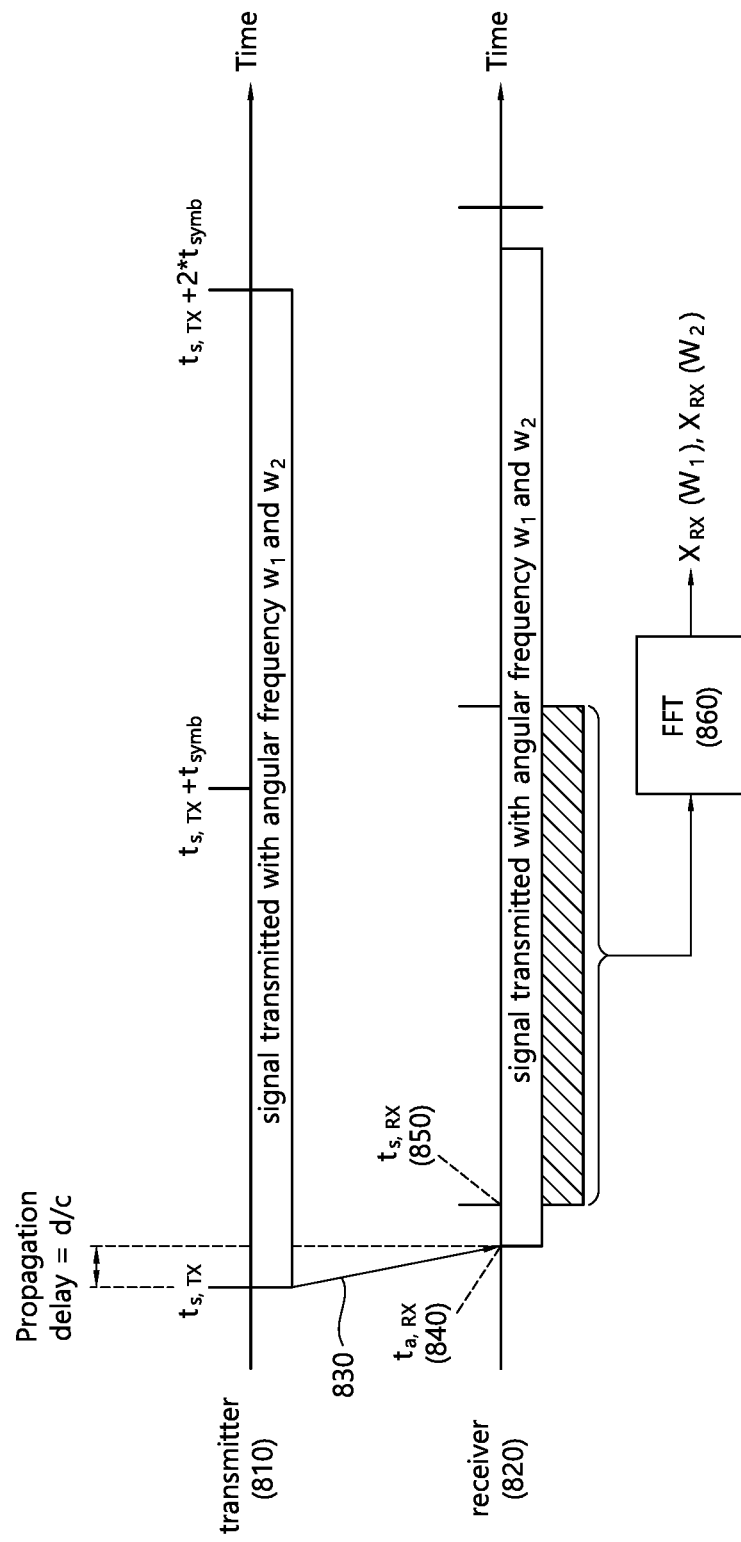
FIG. 8 is a diagram illustrating operations in a transmitter and a receiver.

FIG. 8 is a diagram illustrating operations in a transmitter and a receiver. The transmitter is a device for transmitting a transmission signal for distance measurement, and the receiver is a device which receives the corresponding transmission signal, processes the received transmission signal, and then transmits the reception signal generated by the receiver, to the transmitter. An example of FIG. 8 relates to a technique by which a transmitter measures a distance between the transmitter and a receiver via the reception signal.

In the example described below, it is assumed that a time point at which a transmitter and a receiver perform signal transmission and reception operations is quantized. For example, when transmitting and receiving a signal based on OFDM, the boundary point of each OFDM symbol is a quantized time point for performing transmission and reception operations. For convenience, it is assumed that the start time of the transmitting and receiving operations of the transmitter and the receiver starts from $t_{s,TX}$ and $t_{s,RX}$, respectively, and it is assumed that they appear repeatedly for each $t_{symb}$. In the case of OFDM, $t_{symb}$ may be the length of an OFDM symbol.

The transmitter is located at x=0 and transmits the distance measurement signal (i.e., transmission signal) through two frequencies w1 and w2 at $t=t_{s,TX}$. In this case, the initial phases of the two frequency components of the transmission signal may be set to be the same or may be set to be different from each other by a preset amount. Hereinafter, an example in which the initial phases are the same will be described for convenience of description. In this case, the transmission signal observed at the location of the transmitter is then shown below.

$$E(w_1,t,x=0)=A(0)*\exp(j*(w_1*(t-t_{s,TX})+\phi)),$$

$$E(w_2,t,x=0)=A(0)*\exp(j*(w_2*(t-t_{s,TX})+\phi)), \quad \text{[Equation 2]}$$

It is assumed that the receiver is placed away from the transmitter by d. The signal transmitted by the transmitter at $t=t_{s,TX}$ arrives at the receiver at $t=t_{a,RX}=t_{s,TX}+d/c$. The signal observed by the receiver is shown below.

$$E(w_1,t,x=d)=A(d)*\exp(j*(w_1*t-w_1*t_{s,TX}-k_1*d+\phi)),$$

$$E(w_2,t,x=d)=A(d)*\exp(j*(w_2*t-w_2*t_{s,TX}-k_2*d+\phi)) \quad \text{[Equation 3]}$$

As previously assumed, it is assumed that the point in time at which the receiver can actually start to process the transmission signal (for example, the OFDM processing point in the receiver) is quantized and the above signal is processed at $t=t_{s,RX}$. In the example of FIG. 8, it is assumed that OFDM processing using fast Fourier transform (FFT) is performed. The form of multiplying sinusoidal signals of various frequencies appearing as multiples of the fundamental frequency with initial phase=0 at $t=t_{s,RX}$, and adding the result values is shown. In this case, it is remained only when the sinusoidal signal of the same frequency as the frequency of the reception signal is multiplied due to the property of the FFT, and in the case that it is multiplied with other frequencies, it becomes 0 in the summing-up process. According to the attributes of the FFT operation/process as described above, the value $X_{RX}(w_1)$ obtained by the receiver for the frequency ω component as the FFT result is expressed by the following equation.

$$\begin{aligned}X_{RX}(w_1) &= E(w_1, t, x = d) * \exp(-j * w_1(t - t_{s,RX})) \\ &= A(d) * \exp(j * (w_1 * t - w_1 * t_{s,TX} - k_1 * d - w_1 * t + w_1 * t_{s,RX} + \phi)) \\ &= A(d) * \exp(j * (w_1 * t_{s,RX} - w_1 * t_{s,TX} - k_1 * d + \phi)) = A(d) * \exp(j * (w_1(t_{s,RX} - t_{a,RX}) + \phi))\end{aligned} \quad \text{[Equation 4]}$$

The above-described FFT operation/process is equally applied to the frequency w2 component, and the resulting value $X_{RX}(w_2)$ is expressed as follows.

$$X_{RX}(w_2)=A(d)*\exp(j*(w_2(t_{s,RX}-t_{a,RX})+\phi)) \quad \text{[Equation 5]}$$

The receiver may compare the two values ($X_{RX}(w_1)$, $X_{RX}(w_2)$) obtained through the above equation as follows.

$$\frac{X_{RX}(w_2)}{X_{RX}(w_1)} = \exp(j*(w_2-w_1)(t_{s,RX}-t_{a,RX})) \quad \text{[Equation 6]}$$

Since the frequencies w1 and w2 of the transmission signal are known to the transmitter and the receiver, the receiver can calculate $t_{s,RX}-t_{a,RX}$ through Equation 6. Herein, $t_{s,RX}$ indicates a time point when the distance measurement signal is actually received by the receiver, and $t_{a,RX}$ indicates a time point of the OFDM processing by the receiver. As a result, the receiver may calculate a difference between the time point at which OFDM processing is started and the time point at which the actual signal reaches the receiver.

Through this, even if the receiver performs OFDM processing only at a specific quantized time point, the receiver may calculate the time when the signal transmitted by the specific transmitter actually arrives through appropriate phase calculation. In particular, this part is helpful when several devices transmit signals using different frequencies. Even if the receiver performs only a single FFT operation on the signal in which all signals overlap at a specific quantized point in time, the receiver may recognize a time point when an individual signal is received through subsequent simple phase calculations. In order for a receiver to recognize a time point of receiving an individual signal without using such an improve technique, very complex calculations and signal processing are required because it is necessary to determine whether a particular signal has arrived at each time point in the time dimension (for example, whether the value that correlates the expected signal with the actual signal is above a certain level).

The technical features described above will be described below with reference to FIG. 8.

The example of FIG. 8 may be used for distance measurement in a wireless communication system including a transmitter and a receiver that process signals in symbol units. In the example of FIG. 8, a symbol is a unit including conventional OFDM, OFDMA, and SC-FDMA symbols, and means a time unit for transmitting/receiving a radio signal. In FIG. 8, as described above, the transmitter 810 is a device for transmitting a transmission signal 830 for distance measurement, and a receiver 820 is a device that receives and processes a signal (that is, a transmission signal) transmitted by the transmitter 810.

As described above, the transmitter 810 may transmit the transmission signal 830 through a preset first frequency and a preset second frequency (e.g., w1, w2). That is, the transmission signal 830 may include a first transmission component for the first frequency w1 and may include a second transmission component for the second frequency w2. The transmission signal 830 including the second transmission component may be represented by Equation 2 and/or Equation 3 above.

The transmission signal 830 arrives at the receiver 820 at a "reception time point 840," which is represented by $t_{a,RX}$ in the above-described example. Since the receiver 820 processes the transmission signal 830 (e.g., processes OFDM) in units of symbols, the actual processing for the corresponding signal starts at the processing point 850. The processing time point 850 is represented by $t=t_{s,RX}$, in the above-described example.

The receiver 820 may calculate $X_{RX}(w_1)$ as shown in Equation 4 through the FFT operation 860 for the first transmission component, and may calculate $X_{RX}(w_2)$ as shown in Equation 5 through the FFT operation 860 for the second transmission component. As a result, the receiver 820 may compare two different FFT calculation values (for example, by applying Equation 6), to thereby calculate the difference between the processing time point 850 and the reception time point 840 in the receiver 820.

Meanwhile, the first frequency w1 and the second frequency w2 may be determined in consideration of various situations. As described in Equation 6, since the difference between the first frequency w1 and the second frequency w2 may be calculated by multiplying the difference between the processing time point 850 and the receiving time point 840, when the difference between the first frequency w1 and the second frequency w2 is set to be large, the difference between the processing time point 850 and the reception time point 840 may be easily obtained in the receiver 820. That is, on the condition that the difference between the first frequency and second frequency is large, even when the difference between the processing time point 850 and the reception time point 840 is small, the final result value of Equation 6 becomes large, so that a small difference can be easily found. However, when the difference between frequencies increases, errors may occur in the calculation due to the frequency selective characteristic of the channel. Accordingly, the difference between the preset frequencies may be fixed but may be adaptively determined in consideration of channel characteristics. For example, at the transmitter 810, the receiver 820, and/or a third entity, a set of possible frequencies may be signaled in advance, and then indication information about the frequency to be actually used may be signaled or information about the channel characteristics may be signaled to thereby indicate the frequency to be actually used.

On the other hand, as shown in Equation 6, the operation value in the receiver 820 is calculated in the form of a phase. Accordingly, there may be a problem in that the case where the value of $(w_2-w_1)(t_{s,RX}-t_{a,RX})$ exceeds the range of 360 degrees is not distinguished from the case where it is not. However, since the difference between the processing time point 850 and the reception time point 840 in the actual channel environment may be shorter than the symbol length, the above-described problem will not be a big problem in the actual system implementation.

Through the above-described operation, the receiver 820 may obtain information about a difference between the processing time point 850 and the reception time point 840. Hereinafter, two detailed examples of measuring the distance to the transmitter 810 using the calculated information are proposed.

<Measuring Scheme 1>

It is possible for the receiver 820 to separately signal a difference (i.e., $t_{s,RX}-t_{a,RX}$) between the processing time point 850 and the reception time point 840. For example, the information (that is, the information about the difference in viewpoints) may be appropriately quantized, and then the quantized result may be formed into a series of bit strings, and the data having the generated bit strings as information may be transmitted to the transmitter 810. In addition, the receiver 820 transmits its distance measurement signal (processed as a reception signal on the part of the transmitter). In this case, the same frequency as the frequency used by the transmitter may be used as the distance measurement signal transmitted by the receiver, but different frequencies may be used.

As a specific example, in this case, the receiver 820 may transmit a signal in the same form as the transmitter 810 by using the first and second frequencies w1 and w2 at a time point $t=t_{s,RX}+n*t_{symb}$. This means that it transmits at the n-th quantized time point (e.g., the n-th OFDM symbol), and this n value may be a predetermined value. This signal (that is, a reception signal transmitted from the receiver to the transmitter) arrives at the transmitter at the time $t=t_{a,TX}=t_{s,RX}+n*t_{symb}+d/c$. Since $t_{s,RX}<t_{s,RX}$ is assumed above, the transmitter 810 performs OFDM processing on the reception signal at a time point $t=t_{s,TX}+(n+1)*t_{symb}$.

In this case, the transmitter 810 may perform an FFT operation on the first/second frequency to calculate a value corresponding to Equations 5 and 6 above. That is, the difference between the processing time $(t_{s,TX}+(n+1)*t_{symb})$ and the receiving time $t_{a,TX}$ in the transmitter 810 can be calculated. That is, the transmitter 810 may acquire the information $t_{s,TX}+(n+1)*t_{symb}-t_{a,TX}$. If the corresponding value is obtained, it is possible to obtain the distance d from the transmitter 810 according to Equation 7 below. This is because $t_{symb}$ is a value already known to both the transmitter and the receiver. Equation 7 is obtained by adding information $t_{s,TX}+(n+1)*t_{symb}-t_{a,TX}$ obtained by the transmitter to $t_{s,RX}-t_{a,TX}$ which is separately signaled by the receiver.

$$t_{s,RX}-t_{a,RX}+t_{s,TX}+(n+1)*t_{symb}-t_{a,TX}=t_{s,RX}-t_{s,TX}-d/c+t_{s,TX}+t_{symb}-t_{s,RX}-d/c=t_{symb}-2d/c \quad \text{[Equation 7]}$$

<Measuring Scheme 2>

The measuring scheme 1 is an example of transmitting the processing time point 850 and the reception time point 840 through separate signaling in the receiver 820. In contrast, the following example is an example of generating the same effect as a separate signaling by applying the phase difference to the distance measurement signal (e.g., reception signal) which is transmitted from the receiver 820 to the transmitter 810) without separately signaling the difference between the processing time point 850 and the reception time point 840. That is, it is possible to reflect the information $t_{s,RX}-t_{a,RX}$ obtained by the receiver 820 on the phase difference between two frequency components (i.e., w1 and w2) used for its distance measurement signal (i.e., the reception signal).

In detail, the receiver 820 sets the phases of the two frequency components (i.e., w1 and w2) in the distance measurement signal (i.e., the reception signal) transmitted by the receiver 820 itself to become different by the following values.

$$B = \arg\left(\frac{X_{RX}(w_2)}{X_{RX}(w_1)}\right) = \quad \text{[Equation 8]}$$
$$(w_2 - w_1)(t_{s,RX} - t_{a,RX}) = (w_2 - w_1)(t_{s,RX} - t_{s,TX} - d/c)$$

In this case, when the position of the receiver 820 is regarded as x=0, the signal may be shown as follows.

$$R(w_1,t,x=0)=A(0)*\exp(j*(w_1*(t-t_{s,RX}-n*t_{symb})+\phi))$$

$$R(w_2,t,x=0)=A(0)*\exp(j*(w_2*(t-t_{s,RX}-n*t_{symb})+B+\phi)) \quad \text{[Equation 9]}$$

The signal arriving at the transmitter 810 at distance d from the receiver 820 is as follows. The time point at which this signal arrives at the transmitter is $t=t_{a,TX}=t_{s,RX}+n*t_{symb}+d/c$.

$$R(w_1,t,x=d)=A(d)*\exp(j*(w_1*t-w_1*t_{s,RX}-w_1*n*t_{symb}-k_1*d+\phi)),$$

$$R(w_2,t,x=d)=A(d)*\exp(j*(w_2*t-w_2*t_{s,RX}-w_2*n*t_{symb}-k_2*d+B+\phi)) \quad \text{[Equation 10]}$$

The transmitter 810 performs the FFT operation by multiplying the sinusoidal signal of initial phase 0 at $t=t_{s,TX}+(n+1)*t_{symb}$, which is also a quantized processing time point. The component w obtained at this time is as follows.

$$X_{TX}(w_1)=R(w_1,t,x=d)*\exp(-j*w_1(t-t_{s,TX}-(n+1)*t_{symb}))=A(d)*\exp(j*(w_1(t_{s,TX}-t_{s,RX}+t_{symb}-d/c)+\phi)) \quad \text{[Equation 11]}$$

In the same manner, the w2 component can be calculated as follows.

$$X_{TX}(w_2)=A(d)*\exp(j*(w_2(t_{s,TX}-t_{s,RX}+t_{symb}-d/c)+B+\phi)) \quad \text{[Equation 12]}$$

When the FFT result value calculated through Equation 11/12 is compared as follows, the distance d between the transmitter 810 and the receiver 820 may be measured.

$$\frac{X_{TX}(w_2)}{X_{TX}(w_1)} = \frac{\exp(j*(w_2(t_{s,TX}-t_{s,RX}+t_{symb}-d/c)+B+\phi))}{\exp(j*(w_1(t_{s,TX}-t_{s,RX}+t_{symb}-d/c)+\phi))} \quad \text{[Equation 13]}$$
$$= \exp(j*((w_2-w_1)(t_{s,TX}-t_{s,RX}+t_{symb}-d/c)+$$
$$(w_2-w_1)(t_{s,RX}-t_{s,TX}-d/c)))$$
$$= \exp(j*(w_2-w_1)(t_{symb}-2d/c))$$

The above-described equations are merely an example of applying the technique according to the present specification in a specific environment, and the content of the present specification is not limited to the above-described equations. An example of the present specification, for example, the measuring scheme 2 may be described in another format as follows.

The transmitter 810 receives a reception signal from the receiver 820. The reception signal includes a first reception component for the first frequency (i.e., w1) and a second reception component for the second frequency (i.e., w2). In addition, a phase difference set by the receiver may be applied between the phase of the first reception component and the phase of the second reception component. The phase difference is set based on a difference (for example, $t_{s,RX}-t_{a,RX}$) between the processing time point 850 and the reception time point 840 calculated by the receiver 820 through the transmission signal 830. The phase difference is also set based on the difference between the first frequency and the second frequency (i.e., w2−w1). An example of such a phase difference may be expressed by Equation 8 above.

The transmitter 810 processes signal processing (e.g., OFDM processing) at a quantized time point with respect to a reception signal to which a phase difference is applied. That is, the reception signal may be received at $t_{a,RX}$ and processed at $t_{s,TX}$. When the FFT operation is performed on the first frequency component and the second frequency component of the reception signal, a corresponding FFT value may be calculated, and examples of such FFT values are as shown in Equations 11 and 12. The transmitter 810 may calculate the final distance d by comparing the calculated FFT value.

The above-described measuring method 1 and measuring method 2 has the following advantages and disadvantages. First, the measuring scheme 1 is not limited to the usage in the transmitter 810 specified by the distance measurement signal (i.e., the reception signal) transmitted by the receiver 820 because in the signal itself, the receiver 820 generates two frequency components with the same phase without any restriction. Accordingly, this signal can be received by various transmitters and used for distance calculation. In this case, the receiver 820 should transmit information $t_{s,RX}-t_{a,RX}$, obtained for the distance measurement signal of each transmitter to each transmitter.

Measuring scheme 2 has the advantage that the receiver 820 can include the necessary information therein while transmitting a distance measurement signal (i.e., a reception signal) without separate information transmission, but since the distance measurement signal corresponding to the individual transmitter needs to be transmitted, the number of times of transmission of the distance measurement signal may increase.

The assumptions applied in explaining the principles described above may vary depending on the specific signal design (for example, whether or not the cyclic prefix is used in the OFDM signal and its length) or the synchronization scheme between the transmitter and the receiver, but applying the same principle to measure the distance is also possible.

The aforementioned distance measuring scheme can be used to measure the distance between different entities (e.g., a vehicle and/or an UE). That is, the distance between each other can be measured in a manner that different entities exchange transmission signals and reception signals. In addition, the schemes described above can also be used to measure direction, position, etc. between wireless communication systems. For example, a particular entity on the network (e.g., a vehicle and/or a UE) may measure the distance from another entity (e.g., a base station) of which the location is already known, and it is also possible to know its own exact absolute position.

The above-described distance measurement techniques can be initiated under specific conditions. For example, when the information value according to another positioning technique such as GPS exceeds a preset threshold value, the measuring scheme may be started. Further, the above-described measuring scheme may be started even when a precondition according to a communication standard such as 3GPP is satisfied. In addition, the above distance measuring scheme may be used in combination with an additional example described below. Possible examples are further described below.

Hereinafter, a method of measuring a distance between entities (e.g., vehicles) using a plurality of antenna groups and a beam forming scheme is proposed. It is possible to use the example of FIG. 8 in the process of measuring the distance between respective entities, and further refined distance measurement is possible through the proposed "antenna group and beam information".

Specifically, the following example may solve a problem that may occur when a large device such as an automobile measures a distance between each other through transmission and reception of a wireless signal, but the present disclosure is not limited to this example. In addition, the following example proposes an effective method in a situation of using a part of the antenna or beamforming when transmitting and receiving a radio signal used for distance measurement using a plurality of transmit and receive antennas.

Figure 9:
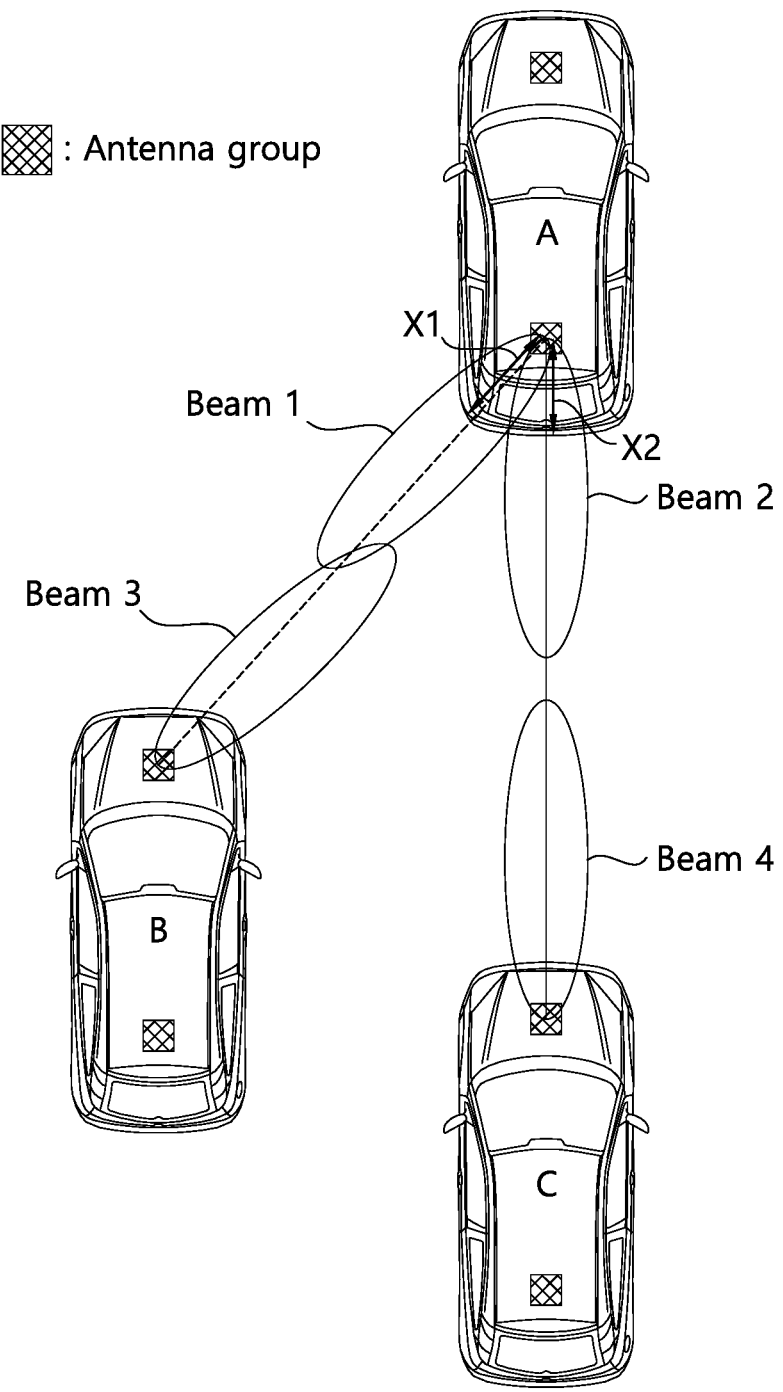
FIG. 9 illustrates a situation in which an example of the present specification may be applied.

FIG. 9 illustrates a situation in which an example of the present specification may be applied. The example of FIG. 9 is an example related to a vehicle, but as described above, examples of the present specification are not limited to the vehicle.

As shown, two antenna groups may be installed in a vehicle. By distributing a plurality of antenna groups in one vehicle, it is possible to solve the problem that the radio signal is blocked in the vehicle body. That is, one antenna group does not need to receive signals in all directions and transmit signals in all directions.

As illustrated, it is assumed that each antenna group is composed of a plurality of antenna elements and can perform beamforming to amplify a transmission/reception signal in a specific direction. FIG. 9 shows a case that the vehicle A transmits a distance measurement signal using an antenna group (for example, a first antenna group) installed at the rear side and uses beam 1 and beam 2, respectively. Vehicles B and C receive the signal of vehicle A by using the antenna group installed in front, and using beam 3 and beam 4, respectively. Although not specifically illustrated in FIG. 9, an antenna group (e.g., a second antenna group) installed in front of the vehicle A may also configure a plurality of transmission beams. It is also possible to communicate with either vehicle B or vehicle C via the transmission beam of this second antenna group.

Hereinafter, a specific example of "antenna group and beam information" is proposed. The antenna group and the beam information mean various pieces of information that are additionally necessary for a situation of measuring a distance between entities (vehicles). The antenna group and beam information may be signaled in advance or signaled in a distance measuring process between vehicles as in the following example.

The antenna group and beam information may include various information. For example, it may include at least one of 1) information about antenna-vehicle body distance, 2) information about radio resources (e.g., time/frequency/code resources) used for the transmission beam (e.g., the beam for transmitting the distance measurement signal), 3) information about a sequence (e.g., a bit sequence) used for a transmission beam (e.g., a beam for transmitting a distance measurement signal), 4) information about characteristics (e.g. antenna gain, direction, power) regarding the transmission beam, and 5) reference information used to generate a signal in a receiving vehicle (e.g., a mapping relationship between a transmitting beam in a transmitting vehicle and a receiving beam in a receiving vehicle, and a threshold power value for selecting a signal to be processed when a plurality of signals are received by the receiving vehicle). In addition, the information about the antenna-vehicle body distance may include all examples of various information related to the antenna and/or the vehicle body. For example, the information may include information about the relative position of the antenna from a particular reference point of the vehicle. In this case, the reference point may be, for example, the leftmost front point of the vehicle. In addition, the information may include information on the size (length, width, and/or height) of the vehicle as an example of the information about the vehicle. In addition, the information may include index and/or location information of the antenna group participating in the actual transmission.

The antenna group and the information elements included in the information may have a mapping relationship with each other. In addition, information on such a mapping relationship may also be indicated by one information element in the antenna group and beam information. For example, a particular antenna-body distance can be mapped to a particular radio resource and/or sequence or the like. Accordingly, the receiving entity (vehicle) that has obtained the antenna group and the information in advance may determine what antenna-vehicle body distance information should be used when a distance-specific signal is received through a specific resource/sequence or the like.

In view of the fact that a large number of specific entities (vehicles) travel in a large area, it is not desirable to exclusively allocate information such as specific resources/sequences for distance measurement between respective entities, and it is not desirable to fixedly determine the above-described mapping relationship. That is, it is preferable that the entity decides itself or dynamically determines a specific resource/sequence and the like in a manner that is scheduled through a higher entity (e.g., a base station) and dynamically determines a mapping relationship between respective information elements. However, the distance measurement between entities need be repeated in very short periods, whereas the information according to the antenna group and beam information need not be repeated in short periods. In consideration of this point, the following example is proposed.

An example of the antenna group and the beam information including the information on the antenna-vehicle body distance will be described below.

In measuring the distance between vehicles, the information that is really important may be the distance between the vehicle bodies. However, the distance obtained by the signal transmission through the antenna is a distance between the antennas, which does not correspond to the distance between the vehicle bodies, and this problem may be increased especially when the accuracy of measurement of position between vehicles is required to be 1 m or less. Also, as shown in FIG. 9, if a plurality of antenna groups are installed in different positions in a vehicle and the beam used varies according to the situation, the distance between the antenna and the vehicle body also varies according to the beam. Specifically, in FIG. 9, when the vehicle A transmits the distance measurement signal through the beam 1, the distance between the antenna and the vehicle body is approximately X1, but when the vehicle A transmits the distance measurement signal through the beam 2, the distance between the antenna and the vehicle body is approximately X2, and the condition X1>X2 is established.

In the above situation, for more accurate distance measurement, it is preferable that the antenna group and beam information including the information on the antenna-vehicle body distance are signaled.

First, each vehicle may operate so that the distance measurement signals transmitted through different antenna groups and/or different beams may be transmitted using different time/frequency resources, or may use different sequences, to thereby allow mutual distinction. In this process, information on time/frequency/sequence and the like is mapped to information on the antenna-vehicle body distance, and information on the mapping relationship is preferably included in the above-described antenna group and beam information.

For example, in the example of FIG. 9, the distance measurement signal transmitted through the beam 1 and the distance measurement signal transmitted through the beam 2 in the first antenna group may be divided in time/frequency resources or sequences used. Each vehicle may inform the neighbor vehicles of information on the distance between the antenna and the vehicle in the advancing direction of the distance measurement transmission signal defined as a specific time/frequency resource or sequence, in the form of the above-described antenna group and beam information.

Information on the antenna group and beam information (e.g., information about the antenna-vehicle body distance) can be dynamically changed, so that it can be conveyed to surrounding vehicles in advance through relatively long periods of inter-vehicle messages. When each neighbor vehicle receives a distance measurement signal through a specific time/frequency/sequence, each neighbor vehicle may determine the distance between the antenna and the vehicle body in the transmitting vehicle in the corresponding direction based on the corresponding information.

Figure 10:
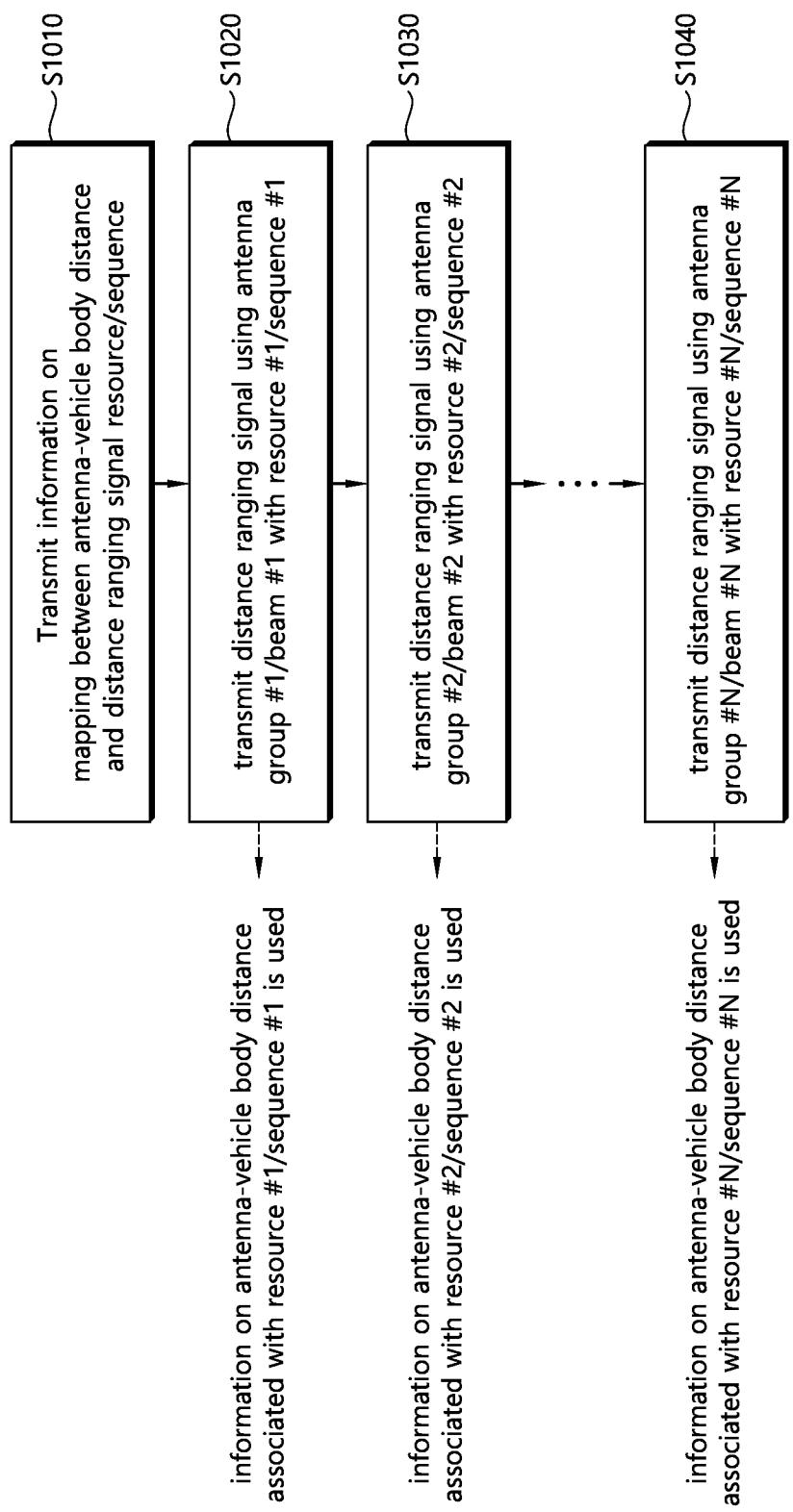
FIG. 10 illustrates an example of first transmitting antenna group and beam information, and then measuring distance between vehicles through a distance measurement signal.

FIG. 10 illustrates an example of first transmitting antenna group and beam information, and then measuring distance between vehicles through a distance measurement signal. As shown, information about the antenna-vehicle body distance and information about the mapping between the distance measurement signals are transmitted first. Thereafter, the vehicle receiving the distance measurement signal may obtain information about the corresponding antenna-vehicle body distance through the time/frequency/sequence in which the distance measurement signal is used. FIG. 10 illustrates an example related to a situation in which information on antenna-vehicle body distance is mapped to information on the mapping, but the mapping relationship between the antenna group and the individual information elements included in the beam information may be variously set.

Figure 11:
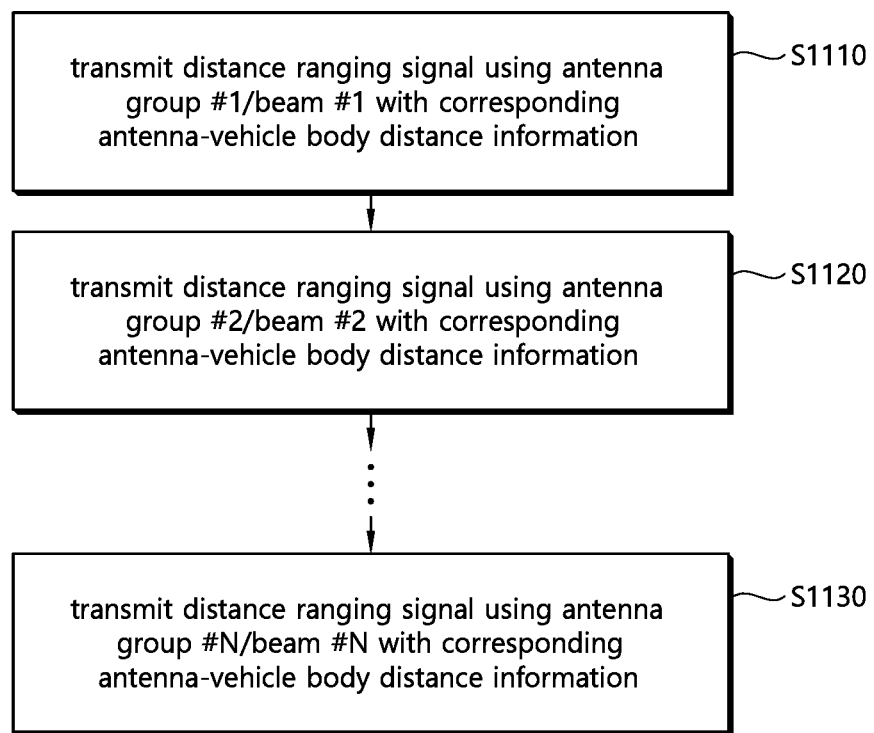
FIG. 11 shows a modified example of FIG. 10.

FIG. 11 shows a modified example of FIG. 10. According to FIG. 11, the vehicle may transmit information on the antenna-vehicle body distance in consideration of the antenna group and the transmission beam used for the transmission while transmitting the distance measurement signal. In the example of FIG. 11, the mapping between the information on the antenna-vehicle body distance and the time/frequency/sequence may not be applied. In other words, it is not necessary to use an associated time/frequency/sequence to transmit a distance measurement signal using a specific antenna group and beam, and it is possible to change time/frequency/sequence dynamically.

Figure 12:
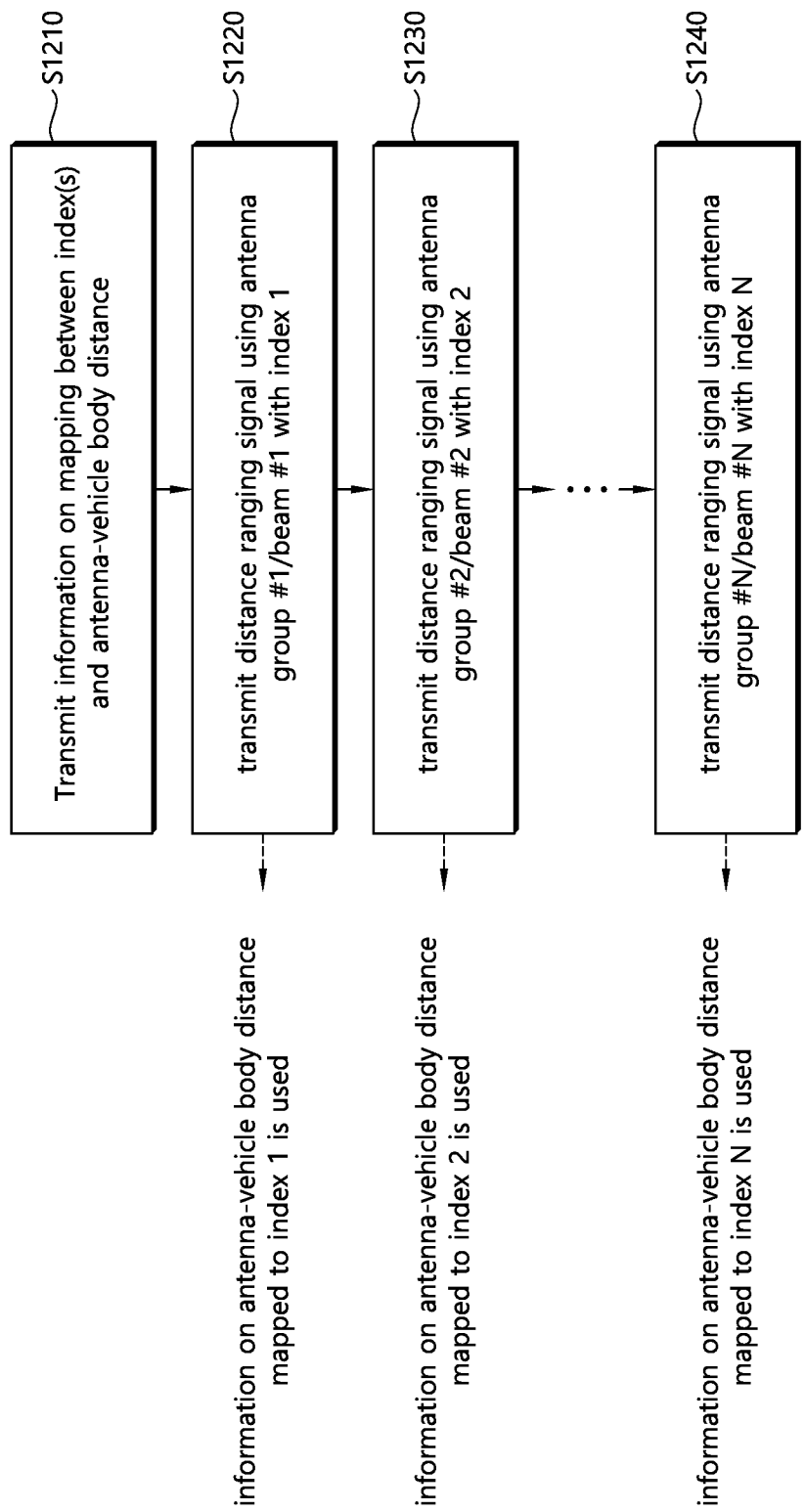
FIG. 12 shows a modified example of FIG. 10.

FIG. 12 shows a modified example of FIG. 10. According to FIG. 12, it is possible to link an index specified in advance to all or a part of information included in the antenna group and the beam information, and transmit the index together at each time when the distance measurement signal is transmitted.

As another example, when the transmission vehicle uses a specific beam, the transmission timing of the distance measurement signal may be adjusted according to the distance between the antenna and the vehicle body corresponding thereto. For example, referring to FIG. 9, when the vehicle A transmits to beam 1, the distance measurement signal is transmitted at a point in time ahead of the time required for the signal to travel by the distance X1 based on a predetermined point in time, but in the case of transmission to beam 2, the distance measurement signal may be transmitted at a point in time preceding the time required for the signal to progress by the distance X2. In this case, the receiving vehicle always seems to start transmitting the distance measurement signal at the edge of the vehicle body at a predetermined point of time, thereby solving the problem that the distance between the antenna and the vehicle body is different for each antenna group and/or beam without additional signaling. On the other hand, as described above, the information on the antenna-vehicle body distance may include information about the relative position of the antenna from a specific reference point of the vehicle. In this case, the adjustment of the transmission time point of the distance measurement signal (first distance measurement signal) may be determined in consideration of the reference point. That is, the transmission time point can be adjusted so that the transmission in each antenna provided in the vehicle appears to be transmitted from a reference point. In detail, the transmission may be performed by delaying the time it takes for the signal transmitted from the reference point to reach the corresponding antenna.

The receiving vehicle, which has received the distance measurement signal from the transmitting vehicle, also determines the distance between the antenna and the vehicle body in consideration of the antenna group which received the signal and the beam used for the reception. The distance between the vehicle bodies may be finally measured by using the distance between the antennas obtained through the above process and the antenna-body distance information of the transmitting vehicle.

The operations described with reference to FIGS. 9 to 12 may be applied even in a situation in which distance measurement between antennas is possible as soon as a signal transmitted by a transmitting vehicle is received. That is, the examples of FIGS. 9 to 12 may be applied when a transmitting/receiving vehicle is connected to a satellite and mutual synchronization is well established, and accordingly, the distance between antennas is measured based on the time spent until a signal transmitted at a predetermined time is received. However, if mutual synchronization is not maintained, the receiving vehicle does not know when the distance measurement signal was transmitted and accordingly the receiving vehicle may retransmit the regression signal at its reception time or a predetermined specific time point derived therefrom, and the transmitting vehicle may measure the distance by calculating a round trip time between two vehicles based on the arrival time of the regression signal.

Figure 13:
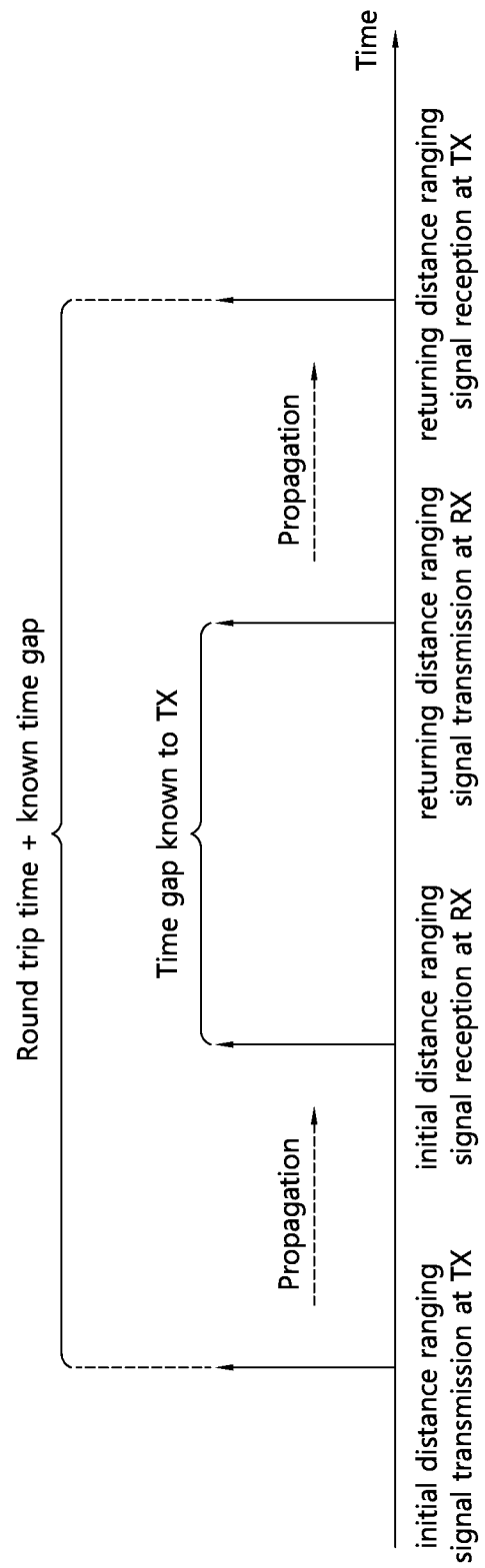
FIG. 13 illustrates an example of measuring a round trip time between two vehicles based on a regression signal transmitted from a receiving vehicle.

FIG. 13 illustrates an example of measuring a round trip time between two vehicles based on a regression signal transmitted from a receiving vehicle.

In this case, the receiving vehicle (a vehicle receiving the first distance measurement signal and transmitting a regression signal thereof) does not need to know information about the antenna-vehicle body distance from the transmitting vehicle (the vehicle transmitting the first distance measurement signal). This is because the final distance between vehicle bodies is calculated by the transmitting vehicle.

However, in order to for the transmitting vehicle to calculate this, information on the antenna group when the receiving vehicle transmits the regression signal and the antenna-vehicle body distance corresponding to the beam is required. To this end, information on antenna-vehicle body distance and mapping of time/frequency/sequence in the antenna group and beam information may be applied. When such mapping information is shared in advance, the receiving vehicle may use a time/frequency/sequence mapped to the antenna group/beam while transmitting a regression signal through the antenna group and the beam that received the initial signal. This example may be understood to be similar to the example of FIG. 10 described above.

Alternatively, antenna-vehicle body distance information corresponding to the antenna group and beam used for each regression signal transmission may be reported. This example may be understood to be similar to the example of FIG. 11 described above.

Alternatively, as described above, an index may be assigned to each antenna group and beam combination, and antenna-vehicle body distance information for each combination may be informed in advance, and then a corresponding index may be informed at every regression signal transmission. This example may be understood to be similar to the example of FIG. 12 described above.

Alternatively, when transmitting the regression signal, it is based on a specific point in time determined from the time of receipt of the first distance measurement signal, and the regression signal may be transmitted at a point in time that advances the distance between the antenna and the vehicle body corresponding to the antenna group and beam used for transmission, thereby exhibiting the effect as if the regression signal (not the end of the antenna) is transmitted at the end of the body.

Hereinafter, a method of selecting an antenna group and a beam for the above regression signal will be described.

When the receiving vehicle receives the initial distance measurement signal and transmits a regression signal thereto, the antenna group and the beam to be used for the regression signal transmission should be determined. Basically, when the receiving vehicle receives a specific initial distance measurement signal through a specific beam of a specific antenna group, the receiving vehicle may operate to transmit a corresponding regression signal using the same antenna group and beam. This allows the bidirectional link between the transmitting vehicle and the receiving vehicle to use the same antenna group and beam so that the round trip time can be accurately calculated.

Even when the transmitting vehicle transmits a specific initial distance measurement signal in one antenna group and beam combination, the receiving vehicle may receive the same signal through different beams or antenna groups. In this case, the receiving vehicle can transmit the regression signal by selecting the antenna group and the beam with the strongest signal, so that a single regression signal transmission can measure the distance on the path between the most dominant transmitting and receiving vehicles. Alternatively, the receiving vehicle uses a plurality of antenna groups and beams that receive a signal at a predetermined level or more, or are received at a predetermined ratio or more with respect to the strongest size signal, or are included within a predetermined number in a reception signal size order, to thereby transmit a regression signal. In this way, the transmitting vehicle can measure the distance for each of the multiple paths that can be formed between specific receiving vehicles, and by combining them properly, the final inter-vehicle distance can be more accurately calculated, or the future inter-vehicle distance can also be estimated by using the speed/direction information of the transmitting/receiving vehicle. At this time, the receiving vehicle transmits the regression signal together with information on the antenna group used to transmit the regression signal and the receiving intensity of the initial distance measurement signal received from the beam, and accordingly, a greater weight may be applied to the calculated values in the antenna group and the beam where the signal reception was strong when a transmitting vehicle combines round trip times based on each regression signal. This reception intensity information may be known through separate signaling (for example, may be signaled through the above-described antenna group and beam information), or may be indirectly measured by setting the power used by the receiving vehicle to transmit the regression signal to be proportional to the reception power of the corresponding initial distance measurement signal (signal transmitted from the transmitting vehicle).

If a case that the antenna group and the beam in which the receiving vehicle receives the initial distance measurement signal differ from the antenna group and the beam used for the regression signal correspondingly transmitted, the information thereabout should also be transmitted to the transmitting vehicle. This is possible by extending the information on the combination of the antenna group and the beam used as described above to a combination of information used to receive the first distance measurement signal at the receiving vehicle side and information used to transmit the regression signal. For example, as described above, when the information on the antenna group and the beam combination is transmitted based on the index, it may be used to refer to the use of one index for receiving the first distance measurement signal and the other for regression signal transmission while delivering two indexes. In particular, such a case may be utilized when a transmission capability and a reception capability do not match in a vehicle antenna implementation, and it may be utilized when, for example, in a specific antenna group, only reception is possible and transmission is not possible, or the number of antenna elements that can be simultaneously used for reception in a specific antenna group is different from the number that can be simultaneously used for transmission.

On the other hand, when the transmitting vehicle transmits the first distance measurement signal for itself using a plurality of antenna groups and beams, the receiving vehicle also receives the first distance measurement signal from the same transmitting vehicle through the plurality of antennas and beams. Even in this case, the regression signal may be transmitted based on the above-described scheme. For example, the regression signal may be transmitted once in accordance with the antenna group and the beam received with the strongest size. Alternatively, the regression signal may be transmitted several times in accordance with a plurality of antenna groups and beams meeting the conditions described in the above embodiments, and in this case, information on the received power of the first distance measurement signal may also be included.

Meanwhile, depending on the implementation of the antenna, antenna gains may be different between different antenna groups or between different beams formed in the same antenna group. For example, the gain between the main lobe and the sieve lobe may be different within one antenna group. In addition, the gain between different antenna groups may be different.

In this case, if the receiving vehicle attempts to make a distance measurement based on the magnitude of the received power or decides the antenna group and beam to transmit the regression signal, in practice, this may result in measuring the distance in a direction other than the strongest path on the channel path (for example, the path the signal travels through the line of sight without reflection or diffraction). To prevent this, information (e.g., the above-described antenna group and beam information) that is shared in advance or transmitted with the distance measurement signal may include antenna gain when transmitted through a specific antenna group and beam. The receiving vehicle may perform the above-described operation based on the corrected received power. Alternatively, the transmission power of the initial distance measurement signal and the regression signal can be adjusted in consideration of the difference in the antenna gain during transmission. For example, this transmit power regulation can be operated to allow the same power to always be sent in the direction the transmission is directed when transmitted through any antenna group and beam (that is, if the antenna gain of a specific antenna group/beam is low, the transmit power is increased by that amount, and if the antenna gain is high, the transmit power is decreased by that amount).

Specific examples described above may be implemented through various devices. For example, it may be implemented by hardware, firmware, software, or a combination thereof.

Hereinafter, PDOA will be described in more detail.

<Phase Difference of Arrival (PDOA)>

1. Relationship Between Distance and Signal Phase

A range is a factor that is mainly influenced by hardware components and less influenced by phase difference of arrival (PDOA), which is a localization principle of a radio frequency identification (RFID) system. When localized in units of PDOA, the distance mainly depends on a wavelength and a starting phase of a signal emitted from the antenna, and overflows occur in a stage. This does not allow clear identification of objects within these ambiguous areas. For a single antenna, a formula for calculating d for a phase 0 is as follows.

$$d = \frac{\lambda}{2}\left(\frac{\emptyset}{2\pi} + n\right) \quad \text{[Equation 14]}$$

where d is a distance between a reader antenna and a tag, $\lambda$ is a wavelength, $\emptyset$ is a phase difference between a transmission signal and a reception signal, and n is a positive number. Equation 1 shows that a distance from the reader side to the transponder side is a multiple of $\lambda/2$ regardless of the phase change. The phase changes according to the distance, but in this case, distance calculation is impossible by Equation 15.

$$\emptyset = \emptyset_{int} + \emptyset_{prop} \quad \text{[Equation 15]}$$

where $\emptyset$ is a phase of the signal, $\emptyset_{int}$ is an internal phase in the tag, and $\emptyset_{prop}$ is a signal propagation phase. The parameter $\emptyset_{int}$ cannot be calculated. However, when two different frequencies of the tag are used, a value of $\emptyset_{int}$ will be removed.

2. PDOA Based Range Estimation

A PDOA based approach shares the same concept as that of dual-frequency technology for range estimation applied to radar systems. That is, a signal having two fundamental frequencies is used, and the phase difference observed at the two frequencies is used for estimating a range of a reflective object. A situation is considered where the RFID reader transmits two continuous-wave signals (CW signals) at frequencies $f_1$ and $f_2$. When modulation and receiver noise performed in the RFID tag are not considered, a phase of an uplink signal at a frequency $f_i$ may be represented by Equation 3.

$$\emptyset_i = 4\pi f_i d/c \quad \text{[Equation 16]}$$

where i=1, 2, c is an RF signal propagation speed $3 \times 10^8$ m/s, and d is a distance between a reader and a tag. Therefore, the range d may be estimated from the phase difference observed in a return signal corresponding to two frequencies. In practice, phase observation is a wrapping target. That is, a phase at each frequency may be observed only within the range of Equation 4.

$$0 \leq \emptyset_i < 2\pi \quad \text{[Equation 17]}$$

Consequently, the tag range is estimated like Equation 18.

$$\hat{d} = \frac{c\Delta\emptyset}{4\pi(f_2 - f_1)} + \frac{cm}{2(f_2 - f_1)} \quad \text{[Equation 18]}$$

$$0 \leq \Delta\emptyset = \emptyset_2 - \emptyset_1 < 2\pi \quad \text{[Equation 19]}$$

where $\Delta\emptyset$ is wrapped phase difference observation and has a range of Equation 6. m is an unknown integer. A second term in Equation 5 represents range ambiguity due to phase wrapping. Because backscattering modulation changes a signal phase at two carrier frequencies in the same manner, Equation 5 is valid when backscattering modulation is applied. A maximum unambiguous range is as illustrated in Equation 20.

$$d_{max} = c/2|f_2 - f_1| \quad \text{[Equation 20]}$$

3. Multi-Frequency Based Range Estimation

Range estimation of a PDOA method based on dual frequency signaling may be difficult in other situations. One of important limitations is trade-off between a maximum unambiguous range and sensitivity of range estimation to noise. That is, large separation between two frequencies may reduce sensitivity of range estimation to additional noise, but by doing this, a small unambiguous range that may not be fully large for RFID systems and applications of interest is calculated. Another problem is that when a signal is severely blurred at either or both of two carrier frequencies, an unreliable phase is obtained, and then occurs when estimating a range for a received signal. The use of three or more carrier frequencies may overcome this problem and improve accuracy of the phase difference through appropriate data fusion in different frequency pairs. As a result, estimation of the tag range can be improved. Because different frequency pairs may have various range estimation qualities, it is preferable to have a weighted average of range estimation rather than a simple average. In general, there are three important issues related to multi-frequency based range estimation; weighted fusion of range estimation in multi-frequency signaling systems, selection of frequencies, and range estimation obtained from different frequency pairs.

4. Direction of Arrival (DOA) Estimation

There is a one-to-one relationship between a signal direction and an associated received steering vector. Therefore, it should be possible to reverse the above relationship and estimate a direction of a signal from a received signal. Therefore, an antenna array should be able to provide arrival direction estimation. Further, there is a Fourier relationship between the beam pattern and excitation at the array. This makes a DOA estimation problem equivalent to spectral estimation.

Hereinafter, the problem of DOA estimation will be described with reference to FIG. 14.

Figure 14:
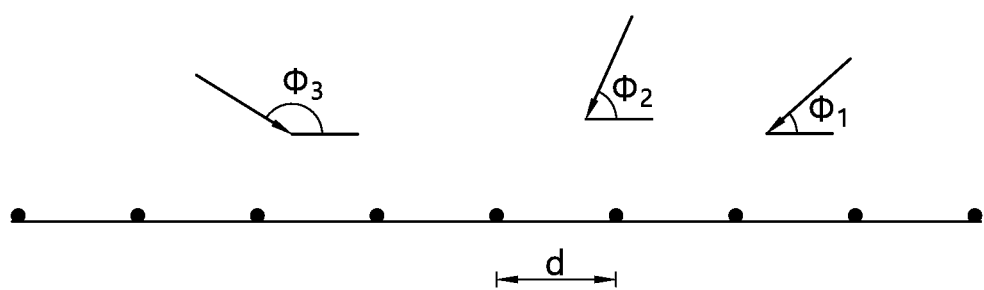
FIG. 14 schematically shows an example of the problem of DOA estimation.

FIG. 14 schematically shows an example of the problem of DOA estimation.

A preset problem is illustrated in FIG. A. The multiple (M) signals have the N number of elements and each collides in a linear and equal spaced array and having a direction $Ø_i$. A goal of DOA estimation is to estimate $Ø_i$ using data received in the array. Here, i=1, . . . M. It is generally M<N, but it is assumed that there is an approach that does not have this limitation (e.g., maximum likelihood estimation). In practice, it is difficult to estimate by the fact that the unknown number of signals in an unknown direction and unknown amplitude collide with an array at the same time. Further, the received signal is always damaged by noise. Correlation, maximum likelihood, MUSIC, ESPRIT, and matrix pencil may be used for DOA estimation.

Hereinafter, the present document will be described.

As described above, in V2X communication, there is a need to provide a method in which a UE (e.g., V2X UE) measures a distance to another UE (e.g., V2X UE), and accordingly, there is a need to provide a method of efficiently performing (sensing based) (transmission) resource selection/operation related to distance measurement signals between wireless communication devices.

The following proposed methods suggest a method of efficiently performing (sensing based) (transmission) resource selection/operation related to distance measurement signals between wireless communication devices.

As one example, the proposed methods of the present disclosure assume a situation in which a device to be a target for measuring distances measures distances using phase information of radio signals transmitted and received. Further, as an example, in the present disclosure, it is assumed that a signal is transmitted/received by characteristically using two frequencies (or tones), but the principle of the present disclosure may be applied in an extended manner even when the number of frequencies (or tones) used for transmission and reception is generalized.

Further, as an example, the present disclosure assumes a situation in which a plurality of frequencies (or tones) are transmitted simultaneously, but it is also possible to extend and apply the principles of the present disclosure in consideration of transmission at different predetermined time points.

Further, as an example, the present disclosure assumes a TWO-WAY RANGING (e.g., a method in which a receiver (having received successfully) a signal of a transmitter returns, and the transmitter estimates a distance using a phase difference) situation, but the principle of the disclosure may be applied in an extended manner to a case to which various RANGING techniques are applied.

Further, as an example, the term "setting (or defining)" in the present disclosure may be interpreted in an extended manner as "the network is designated through predefined (physical layer/high layer) signaling (e.g., RADIO RESOURCE CONTROL (RRC), SYSTEM INFORMATION BLOCK (SIB))" and/or "designated/determined (implicitly) according to a predefined rule".

Further, as an example, the term "transmitter" (and/or "receiver") in the present disclosure may be interpreted in an extended manner as "(no mobility) eNB (or ROAD SIDE UNIT (RSU) or RELAY NODE)" and/or "(mobile) vehicle (or UE) (e.g., VEHICLE, PEDESTRIAN UE).

Further, as an example, the term "transmitter (or receiver)" in the present disclosure may be interpreted in an extended manner to a "receiver (or transmitter)". Further, as an example, the term "frequency (or tone)" (related to RANGING SIGNAL transmission) in the present disclosure may be interpreted in an extended manner to the predetermined number of "subcarrier(s)" and/or "RESOURCE BLOCK (RB)", etc.

Further, as an example, the term "sensing" in the present disclosure may be interpreted in an extended manner to an RSRP measurement operation of a "sequence" of a (successfully received) distance measurement signal and/or a "reference signal (or sequence)" used for demodulation/decoding of (together transmitted) data (or payload)" or a preset resource unit (e.g., sub-channel) based RSSI measurement operation.

Further, as an example, the following abbreviations (or terms) are assumed for convenience of description.

Here, as an example, REQ_SIG and/or REP_SIG may be defined in a combination form of "reference signal (or sequence) and data (or payload)" (e.g., may be transmitted through a continuous frequency resource of a preset size) and/or in the form of "sequence".

Here, as an example, a reference signal (or sequence) in an electronic format may be used for demodulation/decoding purposes (e.g., channel estimation) of (together transmitting) data (or payload) as well as distance estimation between transceivers.

Further, as an example, in the present disclosure, the term "reception success" may be interpreted as (REQ_SIG/REP_SIG related) "sequence (or reference signal) detection success" and/or "(together transmitting) data (or payload) demodulation/decoding success".

Signal transmitted by the transmitter (for distance measurement): REQ_SIG (RANGING REQUEST SIGNAL)

Response (/return) signal transmitted by the receiver (successful in receiving REQ_SIG): REP_SIG (RANGING RESPONSE SIGNAL)

Two methods may be provided for a method in which a UE measures a distance to another UE. As one of the methods, a one-way ranging method may be provided, and as another method, a two-way ranging method may be provided.

Among them, when a UE transmits a specific signal (e.g., ranging request signal) to another UE and receives a response signal (e.g., ranging response signal) to the specific signal from another UE in response to the specific signal, the two-way ranging method may mean a method in which the UE measures a distance between the UE and the other UE using a phase. For convenience in understanding this, a method in which a UE measures a distance to another UE will be described with reference to the drawings.

Figure 15:
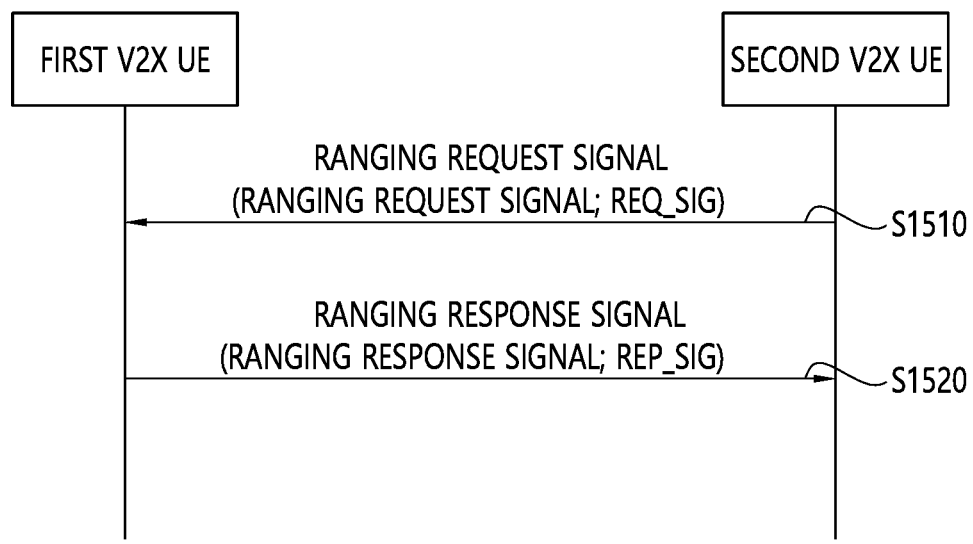
FIG. 15 is a flowchart of a distance measuring method according to two-way ranging that can be applied in the present disclosure.

FIG. 15 is a flowchart of a distance measuring method according to two-way ranging that can be applied in the present disclosure.

Referring to FIG. 15, a first UE (hereinafter, for convenience of description, a 'first UE' and 'first V2X UE' may be used together) may receive a ranging request signal from a second UE (hereinafter, for convenience of description, a 'second UE' and 'second V2X UE' may be used together) (S1510).

Thereafter, the first UE may transmit a ranging response signal as a response to the ranging request signal to the second UE (S1520). In this case, the second UE may estimate a distance using the phase difference based on the ranging response signal received from the first UE.

When the UE measures a distance to another UE through sidelink communication, the UE may measure a distance to another UE through the selected resource based on congestion control and/or sensing (rather than measuring a distance to another UE based on dedicated allocation resources).

Here, when the UE, having received the ranging response signal measures a distance to another UE using the phase difference, it is good in terms of distance measurement accuracy that transmission/reception of the ranging request signal and the ranging response signal is performed/completed as soon as possible, and this is because the above-described phase difference can reduce an influence due to channel changes on the time domain.

In the above aspect, as an example, when REQ_SIG and/or REP_SIG related transmission resource is selected, the (minimum) factor (/side) to be considered is as follows, and when factors to be considered below are not considered, each of the problems described as examples below may occur.

(Factor #1) HALF DUPLEX problem (e.g., wireless communication devices cannot simultaneously transmit/receive at the same time point (for reasons of hardware limitations/magnetic interference, etc.))

Example) After the receiver has successfully received an REQ_SIG of a (specific) transmitter, when the receiver transmits an REP_SIG of the REQ_SIG, the transmitter should not select (at least) a resource at a time point at which the transmitter performs a transmission operation. Otherwise, a problem may occur that the transmitter may not receive the REP_SIG, and not (finally) estimate a distance between the transceivers.

(Factor #2) REP_SIG of the receiver (or REQ_SIG of the transmitter) transmission overhead problem (or REP_SIG (or REQ_SIG) transmission related CONGESTION CONTROL problem)

Example) When the receiver transmits REP_SIG for all REQ_SIG (received successfully), a problem may occur that the chance of receiving REQ_SIG (due to HALF DUPLEX problem) relatively reduces or that a CONGESTION LEVEL increases (due to excessive REP_SIG transmission).

(Factor #3) Collision/interference problem between (REQ_SIG or REP_SIG) transmission resources Example) When REQ_SIG transmission resources between different transmitters (or REP_SIG transmission resources between different receivers) do not overlap (to the maximum), reliability of the corresponding signal may be guaranteed. That is, when REQ_SIG transmission resources between different transmitters (or REP_SIG transmission resources between different receivers) overlap, a problem may occur that reliability of a corresponding signal cannot be guaranteed due to mutually exchanged interference.

(Factor #4) LATENCY between (received successfully) REQ_SIG and (linked) REP_SIG (transmission)

Example) Considering (transmitter/receiver) mobility (and/or channel change on the time domain), transmission as (maximum) quickly as possible of REP_SIG for (received successfully) REQ_SIG is helpful for improving distance measurement reliability (or performance). That is, considering that the transmitter/receiver may each move or the channel may time-vary, if the REP_SIG for REQ_SIG cannot be transmitted as (maximum) quickly as possible, (A) a distance between the transmitting/receiving UEs at a time point in which the REQ_SIG is transmitted and a distance between the receiving UEs and the distance between the transmitting/receiving UEs is changed at the time point in which the REP_SIG is received, or (B) the derived phase difference value includes an error due to a channel change between the transmitting/receiving UEs, and thus a problem may occur in distance measurement reliability (or performance).

Considering the above-described (some) factors (/sides), (sense based) (transmission) resource selection/operation related to the distance measurement signal may be performed according to the following (some) method. Here, as an example, the (some) methods may be limitedly applied only when a (transmitting) resource is selected based on sensing. Here, as an example, a tone (or frequency) spacing distance related to the distance measurement signal may be set (from the network) (according to the target (distance) RESOLUTION (or precision requirement)).

Hereinafter, considering factors (/sides), specific methods of selecting/operating (sense based) (transmission) resources related to the distance measurement signal will be described.

[Proposed Method #1]

As an example, the following (some) parameters related to the distance measurement signal (transmission) may be set differently (or independently) from that for (general) V2X (data) channel/signal (transmission).

For example, when the distance measurement signal transmission (/reception) and V2X (data) channel/signal transmission overlap (on a resource), if setting to prioritize distance measurement signal transmission (/reception) (e.g., V2X (data) channel/signal transmission is omitted) (or V2X (data) channel/signal transmission (/reception) and distance measurement signal transmission overlap (on a resource), it may be set (e.g., distance measurement signal transmission may be omitted) to prioritize V2X (data) channel/signal transmission (/reception).

From an overall viewpoint including all of the first UE (as described above, the 'first UE' and the 'first V2X UE' may be used together) and the second UE (as described above, the 'second UE' and the 'second V2X UE' may be used together) and the eNB, an embodiment to which [Proposed Method #1] is applied will be described below with reference to the drawings.

Figure 16:
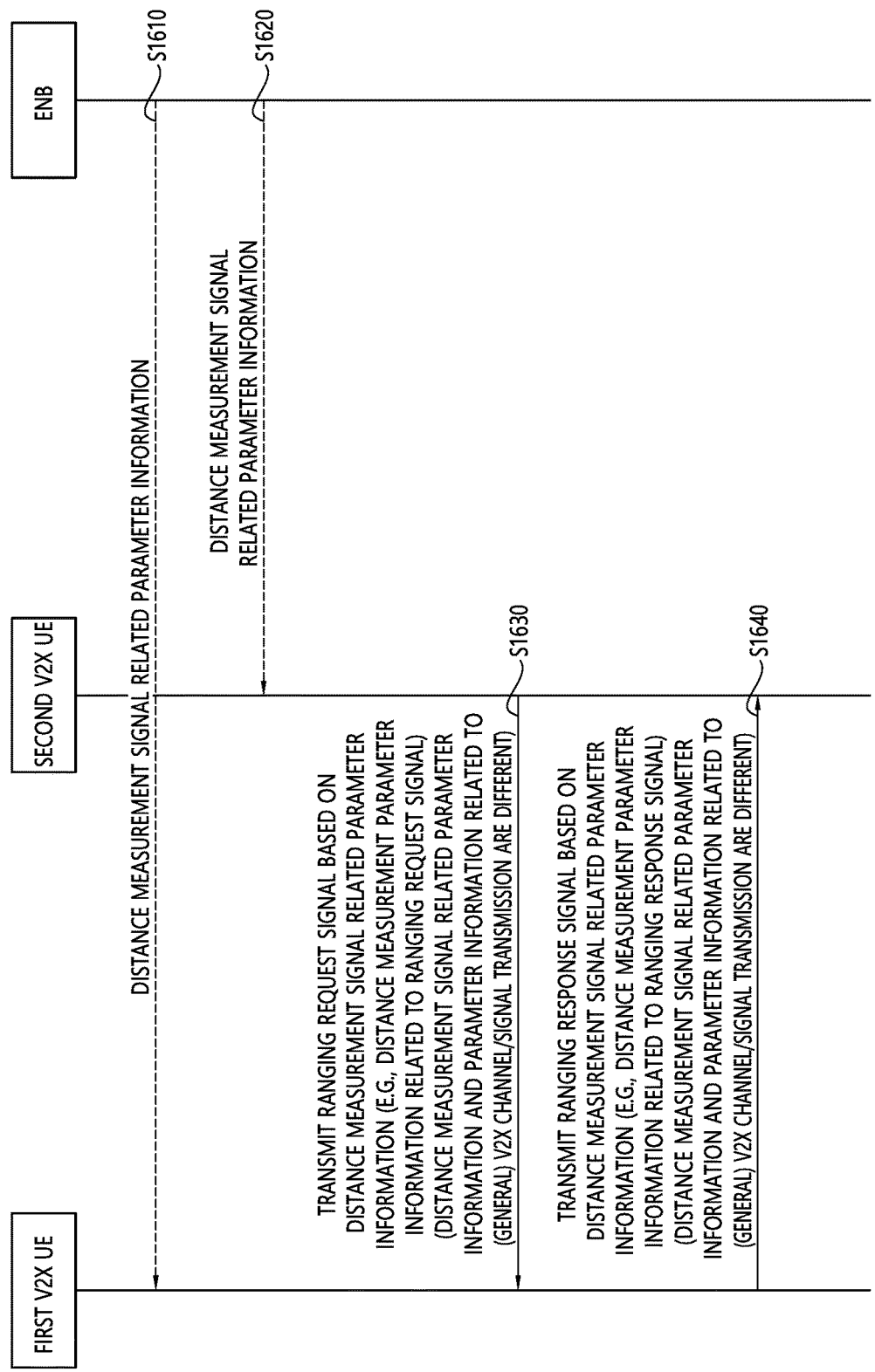
FIG. 16 is a flowchart schematically illustrating an embodiment of a method of transmitting a distance measurement signal according to an embodiment of the present disclosure.

FIG. 16 is a flowchart schematically illustrating an embodiment of a method of transmitting a distance measurement signal according to an embodiment of the present disclosure.

Referring to FIG. 16, a first UE may receive distance measurement signal related parameter information from an eNB (S1610). In this case, for convenience of description, the 'distance measurement signal related parameter information' may be used together with 'distance measurement signal related parameter'.

Here, as described above, the distance measurement signal may include a ranging request signal and/or a ranging response signal. Accordingly, information received by the first UE may mean distance measurement signal related parameter information related to a ranging response signal (and/or ranging request signal).

Here, the first UE may receive parameter information related to the distance measurement signal from an eNB through predefined (physical layer or higher layer) signaling (e.g., RRC message or SIB).

Further, in FIG. 16, although it is illustrated that the first UE receives distance measurement signal related parameter information from the eNB, this is only an example of the present disclosure, and the first UE does not always receive distance measurement signal related parameter information from the eNB. That is, the first UE may (implicitly) determine the distance measurement signal related parameter information according to a predefined rule.

The second UE may also receive distance measurement signal related parameter information from the eNB (S1620).

Similarly, as described above, the distance measurement signal may include a ranging request signal and/or a ranging response signal. Accordingly, the information received by the second UE may mean parameter information related to a distance measurement signal related to a ranging request signal (and/or ranging response signal).

Further, similarly, the second UE may receive distance measurement signal related parameter information from the eNB through predefined (physical layer or higher layer) signaling (e.g., RRC message or SIB).

Further, in FIG. 16, although it is illustrated that the second UE receives distance measurement signal related parameter information from the eNB, this is only an example of the present disclosure, and the second UE does not always receive distance measurement signal related parameter information from the eNB. That is, the second UE may (implicitly) determine the distance measurement signal related parameter information according to a predefined rule.

The first UE may receive a ranging request signal from the second UE (S1630).

Here, the second UE may transmit a ranging request signal to the first UE based on the distance measurement signal related parameter information. As an example, the second UE may transmit the ranging request signal to the first UE based on the distance measurement parameter information related to the ranging request signal.

Here, the distance measurement signal related parameter information and (general) V2X channel/signal transmission related information may be different.

Here, from a viewpoint of the second UE, when transmission of the ranging request signal and (general) V2X (data) channel/signal transmission (/reception) overlap (on a specific resource), the second UE may perform transmission of the ranging request signal instead of performing V2X channel/signal transmission (/reception) (on a specific resource) (i.e., transmission of the distance measurement signal may be prioritized).

Similarly, from a viewpoint of the first UE, when reception of the ranging request signal and (general) V2X (data) channel/signal reception (/transmission) overlap (on a specific resource), the first UE may perform reception of a ranging request signal instead of performing V2X channel/signal reception (/transmission) (on a specific resource) (i.e., reception of a distance measurement signal may be prioritized).

Thereafter, the first UE may transmit a ranging response signal (in response to reception of the ranging request signal) to the second UE (S1640).

Here, the first UE may transmit a ranging response signal to the second UE based on the distance measurement signal related parameter information. For example, the first UE may transmit the ranging response signal to the second UE in response to the ranging request signal based on the distance measurement parameter information related to the ranging response signal.

Here, the distance measurement signal related parameter information and (general) V2X channel/signal transmission related information may be different.

Here, from a viewpoint of the first UE, when transmission of the ranging response signal and (general) V2X (data) channel/signal transmission (/reception) overlap (on a specific resource), the first UE may perform transmission of the ranging response signal instead of performing V2X channel/signal transmission (/reception) (on a specific resource) (i.e., transmission of the distance measurement signal may be prioritized).

Similarly, from a viewpoint of the second UE, when reception of the ranging response signal and (general) V2X (data) channel/signal reception (/transmission) overlap (on a specific resource), the second UE may perform reception of the ranging response signal instead of performing V2X channel/signal reception (/transmission) (on a specific resource) (i.e., reception of the distance measurement signal may be prioritized).

In FIG. 16, as an example, when the distance measurement is performed, a phase difference based on the ranging request signal and the ranging response signal may be used. A detailed description thereof is the same as that described above.

Further, as an example, the distance measurement parameter information may include at least one of sensing operation related information, transmission power related information, resource pool related information, congestion control based link adaption related information, or cyclic prefix (CP) related information. A specific example thereof will be described later.

Here, for example, the distance measurement parameter information includes information about a cyclic prefix (CP) length used for the ranging response (and/or request) signal, and the CP length used for the ranging response (and/or request) signal may be different from a CP length used for V2X data channel transmission (/reception). A specific example thereof will be described later.

Further, as an example, the distance measurement parameter information may be transmitted from the eNB through predefined signaling. A specific example thereof will be described later.

Further, as an example, the distance measurement parameter information may be determined (implicitly) by the first UE or the second UE based on a predefined rule. A specific example thereof will be described later.

Further, as an example, the first V2X UE may determine a transmission resource related to transmission of the ranging response signal, and transmit the ranging response signal to the second V2X UE based on the determined transmission resource. Here, the first V2X UE may determine the transmission resource among the (remaining) resources except for a resource to which the ranging request signal is transmitted. Here, the first V2X UE may select a resource having relatively less interference based on sensing, as the transmission resource. Here, information on a resource to which the ranging request signal is transmitted may be included in the ranging request signal. Here, the first V2X UE may reselect the transmission resource based on whether a transmission resource reselection condition is satisfied. A specific example thereof will be described later.

Further, as an example, the ranging request signal may include at least one of information on ID of the second V2X UE, application ID information, or location information of the second V2X UE. A specific example thereof will be described later.

Hereinafter, a detailed description of information (or parameters) that may be different between (general) V2X channel/signal transmission related information (or parameters) and distance measurement signal related parameter information (or parameters) may be as follows.

(Example #1-1) Sensing operation related parameters (e.g., PRIORITY (or PPPP), resource exclusion threshold, resource reservation period, reserved resource maintenance related counter (candidate) value, sensing section length, etc.)

(Example #1-2) (Maximum) Transmission Power (or Transmission Period)

(Example #1-3) Resource Pool (Example #1-4) CONGESTION (or LOAD) CONTROL based (or according to CBR measurement value) (allowance) LINK ADAPTATION parameter (e.g., maximum (allowance) transmission power, the number of retransmission (allowance), transmission resources (allowance) quantity, MCS (allowance) range, maximum (allowance) MAXIMUM OCCUPANCY (CR) RATIO, etc.)

(Example #1-5) CP length (e.g., when a TARGET RANGE of the distance measurement signal is different from that of the (general) V2X (data) channel/signal: As an example, when a CP length is differently set between the distance measurement signal and the (general) V2X (data) channel/signal, the (resource) pool may be set to not overlap.

Here, the length of the CP related to transmission of the distance measurement signal and the length of the CP related to the (general) V2X (data) channel/signal transmission may be set differently and this will be described in detail as follows.

As an example, (to make it more robust against propagation delay in the case of a distance measurement signal), an extended CP is used as a CP related to a distance measurement signal, and a normal CP may be used as a CP related to a (general) V2X (data) channel/signal (the present disclosure does not deny that a normal CP is used as a CP related to a distance measurement signal and that an extended CP is used as a CP related to (general) V2X (data) channel/signal).

In the above situation (i.e., when a CP related to the distance measurement signal and a CP related to the (general) V2X (data) channel/signal are different), when different CPs coexist in a single pool, the receiver should perform twice blind decoding or an interference problem may occur. Accordingly, when CPs are different in consideration of complexity of the receiver and the interference problem, it may be preferable to set different pools (separated on the time domain).

Therefore, when the CP length is differently set between the distance measurement signal and the (general) V2X (data) channel/signal, it is advantageous that the above-described problem may be prevented by setting the (resource) pool so as not to overlap.

The description described in FIG. 16 will be described repeatedly from a viewpoint of the first UE.

Figure 17:
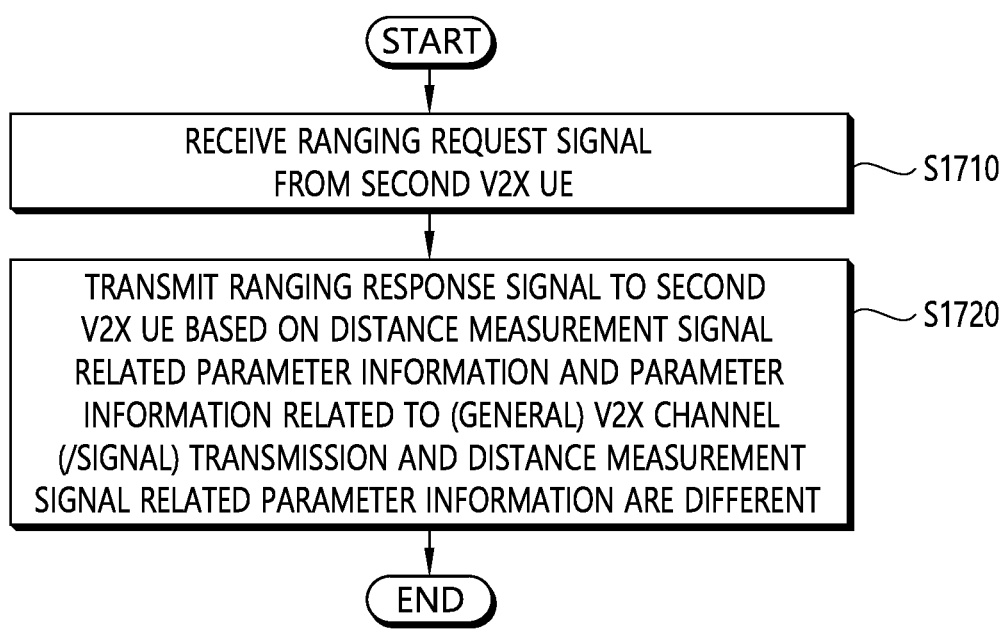
FIG. 17 is a flowchart schematically illustrating an embodiment of a method of transmitting a distance measurement signal from a viewpoint of a first UE.

FIG. 17 is a flowchart schematically illustrating an embodiment of a method of transmitting a distance measurement signal from a viewpoint of a first UE.

Referring to FIG. 17, the first UE may receive a ranging request signal from the second UE (S1710). Here, because a specific example in which the first UE receives the ranging request signal from the second UE is the same as that described above, a detailed description thereof is omitted for convenience of description.

Thereafter, the first UE may transmit a ranging response signal to the second UE based on the distance measurement signal related parameter information (S1720). Here, information related to (general) V2X channel (/signal) transmission and distance measurement signal related parameter information may be different, and because a specific example in which the first UE transmits the ranging response signal to the second UE is the same as that described above, a detailed description thereof is omitted for convenience of description.

Figure 18:
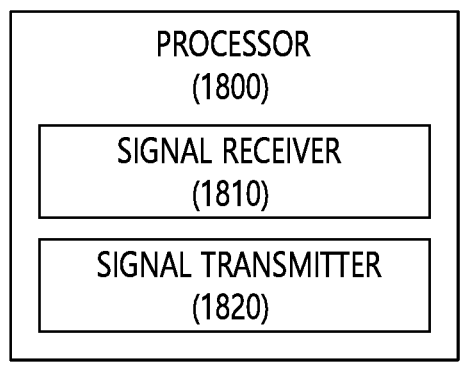
FIG. 18 is a block diagram schematically illustrating an example of a distance measurement signal transmission device from a viewpoint of a first UE.

FIG. 18 is a block diagram schematically illustrating an example of a distance measurement signal transmission device from a viewpoint of a first UE.

Referring to FIG. 18, a processor 1800 may include a signal receiver 1810 and a signal transmitter 1820.

In this case, the signal receiver 1810 may receive a ranging request signal from the second UE. Here, because a specific example in which the first UE receives the ranging request signal from the second UE is the same as that described above, a detailed description thereof is omitted for convenience of description.

Thereafter, the signal transmitter 1820 may transmit a ranging response signal to the second UE based on the distance measurement signal related parameter information. Here, information related to (general) V2X channel (/signal) transmission and distance measurement signal related parameter information may be different, and because a specific example in which the first UE transmits the ranging response signal to the second UE is the same as that described above, a detailed description thereof is omitted for convenience of description.

The description described in FIG. 16 will be described repeatedly from a viewpoint of the second UE as follows.

Figure 19:
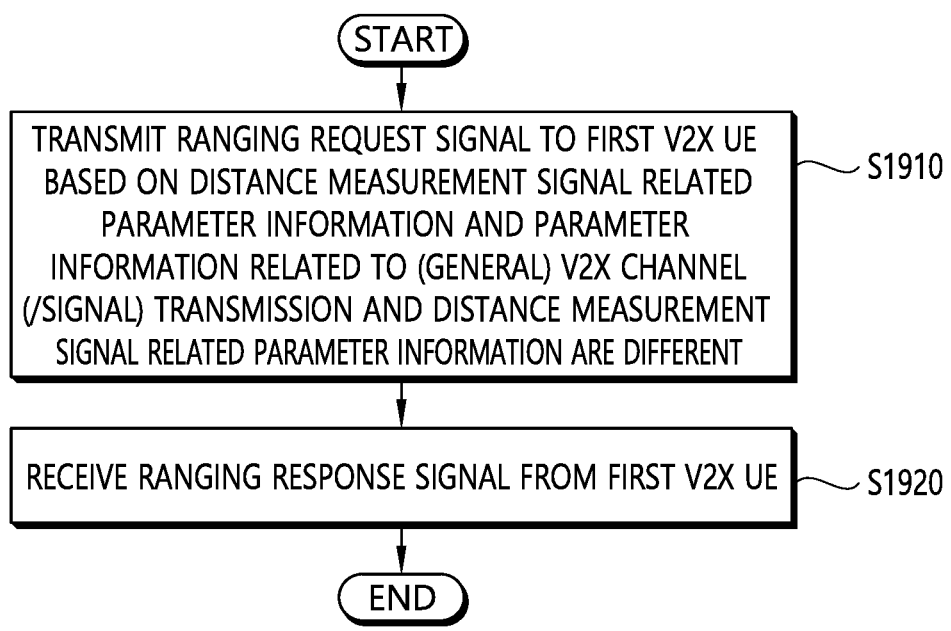
FIG. 19 is a flowchart schematically illustrating an embodiment of a method of transmitting a distance measurement signal from a viewpoint of a second UE.

FIG. 19 is a flowchart schematically illustrating an embodiment of a method of transmitting a distance measurement signal from a viewpoint of a second UE.

Referring to FIG. 19, the second UE may transmit a ranging request signal to the first UE based on the distance measurement signal related parameter information (S1910). Here, information related to (general) V2X channel (/signal) transmission and distance measurement signal related parameter information may be different, and because a specific example in which the second UE transmits a ranging request signal to the first UE is the same as that described above, a detailed description thereof is omitted for convenience of description.

The second UE may receive a ranging response signal from the first UE (S1920). Here, because a specific example in which the second UE receives the ranging response signal from the first UE is the same as that described above, a detailed description thereof is omitted for convenience of description.

Figure 20:
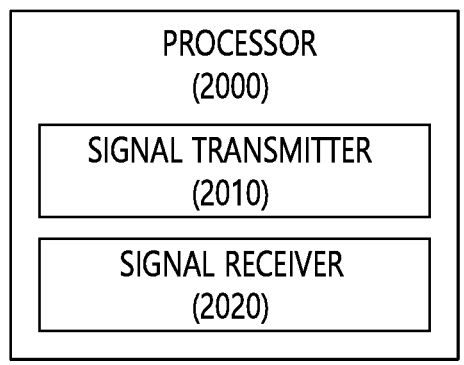
FIG. 20 is a block diagram schematically illustrating an example of a distance measurement signal transmission device from a viewpoint of a second UE.

FIG. 20 is a block diagram schematically illustrating an example of a distance measurement signal transmission device from a viewpoint of a second UE.

Referring to FIG. 20, a processor 2000 may include a signal transmitter 2010 and a signal receiver 2020.

In this case, the signal transmitter 2010 may transmit a ranging request signal to the first UE based on the distance measurement signal related parameter information. Here, information related to (general) V2X channel (/signal) transmission and distance measurement signal related parameter information may be different, and because a specific example in which the second UE transmits a ranging request signal to the first UE is the same as that described above, a detailed description thereof is omitted for convenience of description.

Thereafter, the signal receiver 2020 may receive a ranging response signal from the first UE. Here, because a specific example in which the second UE receives the ranging response signal from the first UE is the same as that described above, a detailed description thereof is omitted for convenience of description.

The description described in FIG. 16 will be described repeatedly from a viewpoint of the eNB as follows.

Figure 21:
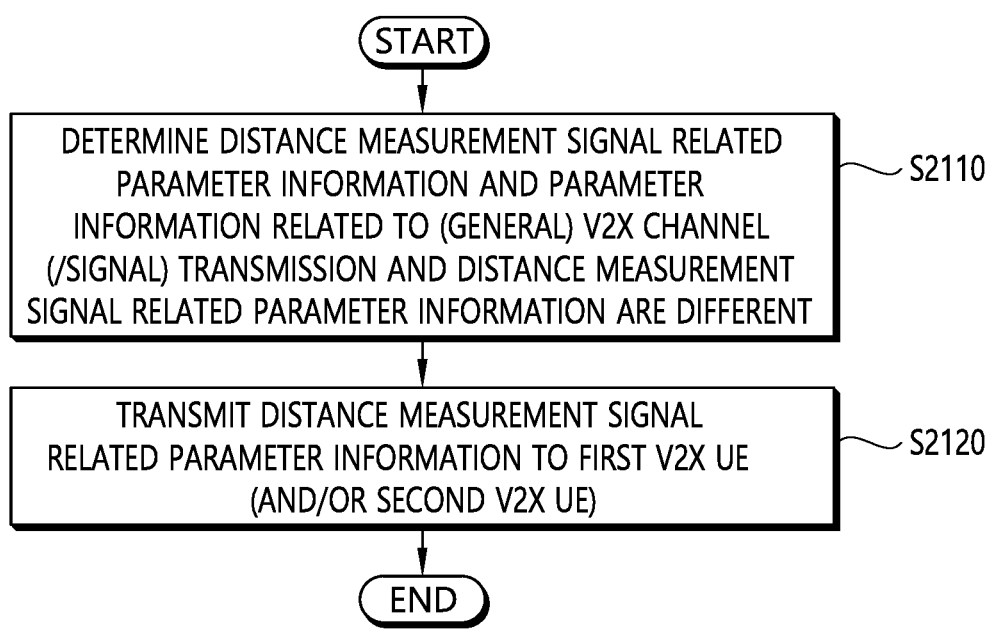
FIG. 21 is a flowchart schematically illustrating an embodiment of a method of transmitting parameter information related to a distance measurement signal from a viewpoint of an eNB.

FIG. 21 is a flowchart schematically illustrating an embodiment of a method of transmitting parameter information related to a distance measurement signal from a viewpoint of an eNB.

Referring to FIG. 21, the eNB may determine distance measurement signal related parameter information (S2110). Here, information related to (general) V2X channel (/signal) transmission and distance measurement signal related parameter information may be different, and because a specific example of the distance measurement signal related parameter information is the same the same as that described above, a detailed description thereof is omitted for convenience of description.

The eNB may transmit distance measurement signal related parameter information to the first UE and/or the second UE (S2120). Here, because a specific example in which the eNB transmits the distance measurement signal related parameter information to the first UE and/or the second UE is the same as that described above, a detailed description thereof is omitted for convenience of description.

Figure 22:
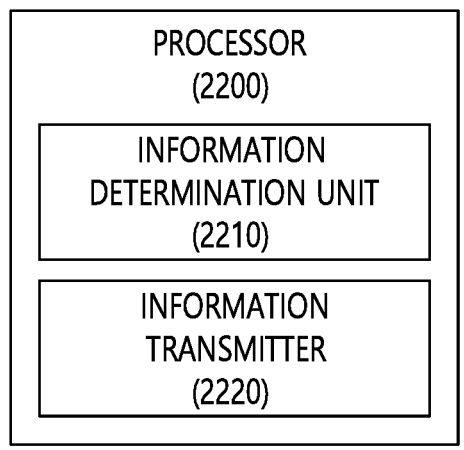
FIG. 22 is a block diagram schematically illustrating an example of a device for transmitting parameter information related to a distance measurement signal from a viewpoint of an eNB.

FIG. 22 is a block diagram schematically illustrating an example of a device for transmitting parameter information related to a distance measurement signal from a viewpoint of an eNB.

Referring to FIG. 22, a processor 2200 may include an information determination unit 2210 and an information transmitter 2220.

In this case, the information determination unit 2210 may determine distance measurement signal related parameter information. Here, information related to (general) V2X channel (/signal) transmission and distance measurement signal related parameter information may be different, and because a specific example of the distance measurement signal related parameter information is the same as that described above, a detailed description thereof is omitted for convenience of description.

The information transmitter 2220 may transmit distance measurement signal related parameter information to the first UE and/or the second UE. Here, because a specific example in which the eNB transmits distance measurement signal related parameter information to the first UE and/or the second UE is the same as that described above, a detailed description thereof is omitted for convenience of description.

Proposed methods to be described below may be operated separately from the above-described [proposed method #1], and in some cases, the proposed methods may be operated in combination with the [proposed method #1] within a range that is not mutually disposed.

When a transmission resource related to REQ_SIG and/or REP_SIG are/is selected, as described in the (minimum) factor (/side) to be considered, if a distance measurement signal is transmitted and received, a half-duplex problem should be considered. Hereinafter, in the [proposed method #2], a method of preventing the half duplex problem will be described in more detail.

[Proposed Method #2]

As an example, when selecting an REQ_SIG related REP_SIG transmission resource in which reception is successful, the receiver may enable to follow the following (some) rules. Here, as an example, for convenience of description, it is assumed that the transmitter #X has transmitted the corresponding (received successfully) REQ_SIG.

When an embodiment to which the [proposed method #2] is applied will be described with reference to the drawings.

Figure 23:
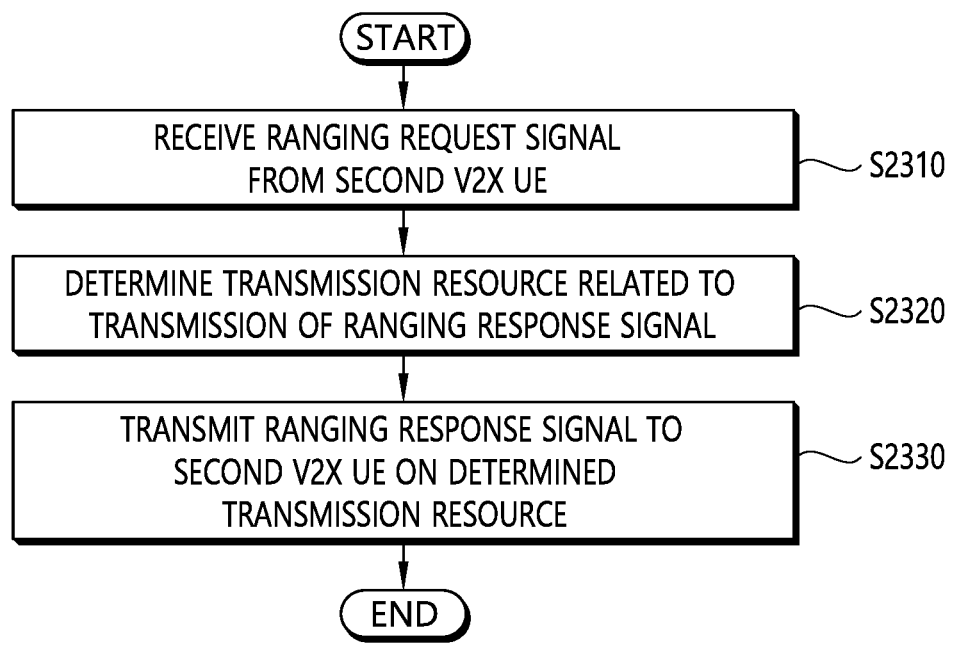
FIG. 23 is a flowchart schematically illustrating an embodiment of a method of transmitting a distance measurement signal according to another embodiment of the present disclosure.

FIG. 23 is a flowchart schematically illustrating an embodiment of a method of transmitting a distance measurement signal according to another embodiment of the present disclosure.

Referring to FIG. 23, a first UE (i.e., receiver) may receive a ranging request signal from a second UE (i.e., transmitter #X) (S2310).

Thereafter, the first UE may determine a transmission resource related to transmission of the ranging response signal (S2320). Here, a specific example in which the first UE determines the transmission resource is as follows.

(Example #2-1) The transmitter #X may enable to exclude a (time) resource to perform a (future) transmission operation (e.g., REQ_SIG), and to select from the remaining (time) resources (e.g., select resources having relatively less interference based on sensing).

Here, as an example, when the corresponding rule is applied, a HALF DUPLEX problem (e.g., a problem in which REP_SIG is received at a time point when the transmitter #X performs a transmission operation, and failing to receive the REP_SIG) may be alleviated.

As an example, the (future) transmission resource information (e.g., (transmission) period, subframe offset, frequency resource location/index, etc.) of the transmitter #X is transmitted through REQ_SIG (or a predefined channel (for that purpose)) or the receiver may (implicitly) check through a predefined rule (e.g., REQ_SIG transmission resource hopping function having (transmitter) ID or REQ_SIG transmission resource parameter (e.g., frequency/time resource location/index), etc.) as an input parameter).

(Example #2-2) (time) resource information to be used for REP_SIG transmission may be signaled on REQ_SIG (or a predefined channel (for that purpose)) of the transmitter #X or REP_SIG transmission (time) resource information may be (implicitly) checked through a predefined rule (e.g., REP_SIG transmission resource derivation function having (transmitter) ID or REQ_SIG transmission resource parameter (e.g., frequency/time resource location/index) as an input parameter).

As an example, when such a rule is applied, the receiver may (finally) select the REP_SIG transmission (frequency) resource only within the corresponding (time) resource (where REP_SIG transmission is allowed/designated).

Thereafter, the first UE may transmit a ranging response signal to the second UE on the determined transmission resource (S2330).

Here, when the first UE transmits a ranging response signal to the second UE, the above-described distance measurement signal related parameter information may be used. That is, the first UE may transmit a ranging response signal to the second UE based on the distance measurement signal related parameter information on the determined transmission resource. Further, as described above, the distance measurement signal related parameter information may be different from the information related to the (general) V2X (data) channel/signal and because a detailed description thereof is the same as that described above, a detailed description thereof is omitted for convenience of description.

The following information may be additionally included in the ranging request signal (i.e., REQ_SIG) received by the receiver (e.g., the first UE) from the transmitter (e.g., the second UE).

[Proposed Method #3]

As an example, (when the proposed method (e.g., [Proposed Method #1] and/or [Proposed Method #2]) of the present disclosure is applied), the transmitter may send (additionally) the following (some) information on the REQ_SIG (e.g., distance measurement signal payload) (or a predefined channel (for that purpose))).

Here, as an example, the receiver (reversely) transmit the following (some) information on the REP_SIG (e.g., distance measurement signal payload) (or a predefined channel (for that purpose)).

Information that may be included in the ranging request signal may be the following information. However, in the present disclosure, it does not mean that all of the following information should be included in the ranging request signal. That is, only some of the following information may be included in the ranging request signal, or all of the following information may be included in the ranging request signal.

(Example #3-1) (GROUP) ID information (thereof) (or distance measurement (or response) target (GROUP) ID information)

For example, when the transmitter sends a ranging request signal to the receiver, there is a need to notify the receiver which transmitter sent the ranging request signal to the receiver.

Accordingly, the ranging request signal may include (GROUP) ID information (of the transmitter).

(Example #3-2) APPLICATION ID information (or SERVICE ID information)

For example, according to an application (or service), requirements related to distance measurement accuracy may be different from each other. Accordingly, the ranging request signal may include ID information for an application (or service).

(Example #3-3) Distance measurement signal (e.g., REP_SIG (or REQ_SIG)) transmission related (resource) parameter information (e.g., SEED (ID) value that derives SEQUENCE INDEX, SEQUENCE/SCRAMBLING/HOPPING PATTERN, etc.)

(Example #3-4) location information (thereof) (or estimated distance information or estimated phase (/time) difference information)

For example, in a one-way distance measurement method, when the transmitter transmits a location thereof to the receiver, the receiver may know a location of the transmitter. In such a situation, when the receiver may also know a location thereof, there may be an advantage in that the receiver may immediately know a distance to the transmitter. Accordingly, the ranging request signal may include information on the location of the transmitter.

As another example, the (some) information may be included in each distance measurement signal (e.g., REQ_SIG or REP_SIG), but may be transmitted together with information such as a resource location, a period, and a sequence of the distance measurement signal through a predefined channel (for that purpose) to be sometimes transmitted, and only the sequence may be transmitted at each (distance measurement signal transmission) time point.

[Proposed Method #4]

As an example, when it is possible to distinguish between REQ_SIG and REP_SIG (e.g., different sequence (/resource) set allocation), if the transmitter (here, the transmitter may mean a transmitter that transmits a ranging request signal or a transmitter that transmits a ranging response signal) (or the receiver (similarly, here, the receiver may mean a receiver that receives a ranging request signal or a receiver that receives a ranging response signal)) performs a sensing based (having high interference or high collision possibility) resource exclusion operation, the transmitter (or the receiver) may apply (preset) different (resource exclusion) thresholds and/or priorities.

In this case, the above-described (resource exclusion) threshold may be an RSSI threshold or an RSRP threshold used for resource exclusion.

For example, even though the second UE transmitted the ranging request signal to the first UE, when the second UE does not receive a ranging response signal from the first UE, a situation may occur in which the second UE repeatedly retransmits the ranging request signal. Here, when the ranging request signal is repeatedly retransmitted, a problem may occur that efficiency of radio resources decreases or a load on the system increases and thus it is preferable to more preferentially protect the ranging response signal rather than the ranging request signal.

Thus, as an example, in the case of REP_SIG, a (relatively) high priority and/or a (relatively) low resource exclusion threshold compared to REQ_SIG may be set.

In this case, for example, by preferentially protecting REP_SIG, an REQ_SIG (and/or REP_SIG) retransmission probability may be lowered or a distance measurement operation (RANGING PROCEDURE) may be completed relatively quickly (or within a short LATENCY).

Contrary to the foregoing description, as another example, in the case of REQ_SIG, a (relatively) high priority and/or (relatively) low resource exclusion threshold compared to REP_SIG may be set.

Hereinafter, specific methods in which the UE retransmits (or ramp transmission power) a distance measurement signal will be described through various examples.

[Proposed Method #5]

As an example, when the REP_SIG for the REQ_SIG transmitted by the transmitter is not received (successfully) within a preset time (or LATENCY), the transmitter may perform a REQ_SIG retransmission operation or perform RAMPING of REQ_SIG transmission power in a preset offset unit.

The reason why the transmitter does not (successfully) receive the REP_SIG for the REQ_SIG transmitted by itself within a preset time (or LATENCY) is that the receiver did not exist in the vicinity and thus there is no object that will send the REP_SIG for the REQ_SIG transmitted by the transmitter.

As described above, even when there is no receiver to send REP_SIG around the transmitter, problems may occur such as decrease of radio resource efficiency, decrease of power efficiency, and increase of a system load that the transmitter excessively repeatedly transmits REQ_SIG or increases transmission power.

Therefore, as an example, in order to prevent excessive REQ_SIG retransmission (or transmission power increase) of the transmitter, the rule may enable the transmitter to be applied (limitedly) through a predefined channel (or message) (e.g., CAM, DISCOVERY, etc.) only when it is determined that the receiver exists (with the certain number (or density) or more) in the vicinity (or within the (distance measurement) effective distance).

Here, as an additional example, the rule may enable the transmitter to perform (limitedly) REQ_SIG transmission only when the receiver exists (with the certain number (or density) or more) in the vicinity (or within a (distance measurement) effective distance).

For convenience of understanding, in [Proposed Method #5], an example of a method of transmitting a distance measurement signal based on whether the receiver exists (or with the certain number (or density) or more) in the vicinity (or within (distance measurement) effective distance) based on (sidelink) discovery will be described below with reference to the drawings.

Figure 24:
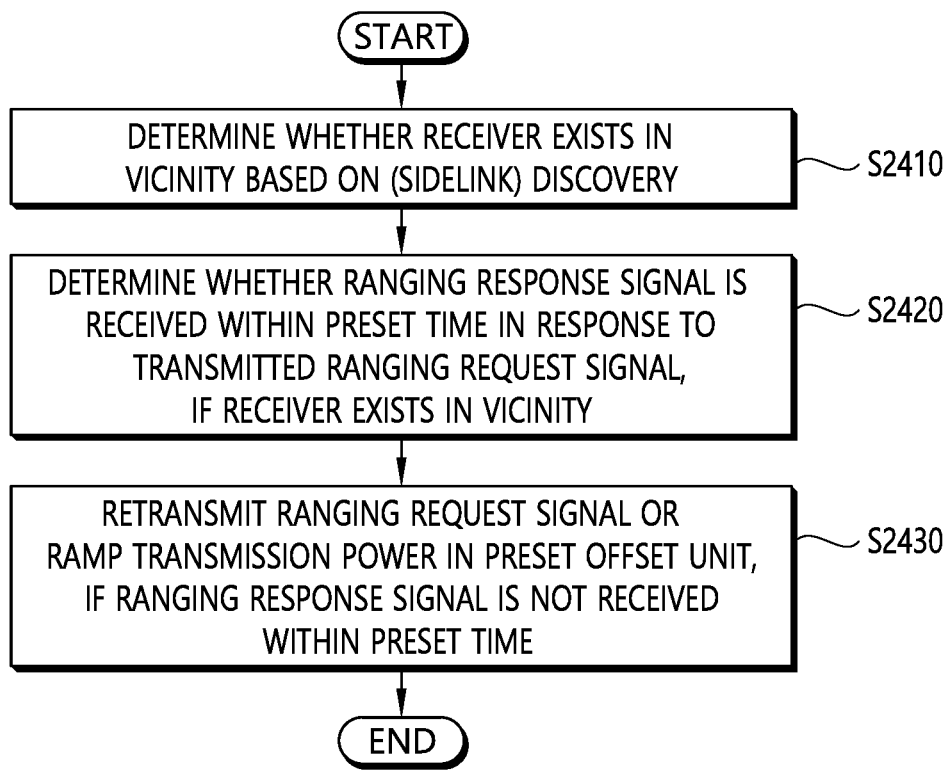
FIG. 24 is a flowchart schematically illustrating an embodiment of a method of transmitting a distance measurement signal according to another embodiment of the present disclosure.

FIG. 24 is a flowchart schematically illustrating an embodiment of a method of transmitting a distance measurement signal according to another embodiment of the present disclosure.

Referring to FIG. 24, a first UE (here, the first UE may mean a 'transmitter') may determine whether a second UE (corresponding to the receiver) exists in the vicinity based on (sidelink) discovery (S2410). This may mean that the transmitter determines whether the receiver exists (with the certain number (or density) or more) in the vicinity (or within a (distance measurement) effective distance) through a predefined channel (or message) (e.g., CAM, DISCOVERY, etc.).

Thereafter, if the second UE (corresponding to the receiver) exists in the vicinity, the first UE may determine whether the ranging response signal is received within a preset time from the second UE in response to the ranging request signal (sent by the first UE) (S2420). Because a specific example thereof is the same as that described above, a detailed description thereof will be omitted for convenience of description.

Thereafter, if the ranging response signal is not received within a preset time, the first UE may retransmit the ranging request signal or ramp transmission power in a preset offset unit (S2430). Because a specific example thereof is the same as that described above, a detailed description thereof will be omitted for convenience of description.

Hereinafter, specific methods in which the UE reselects a resource related to a distance measurement signal will be described through various examples.

[Proposed Method #6]

As an example, a reselection operation of a transmission resource of the distance measurement signal (e.g., REQ_SIG, REP_SIG) may be triggered (or performed) when the following (some) conditions are satisfied.

Here, as an example, the transmission resource (re)selection/reservation operation may be performed (limitedly) only when a wireless communication device exists (with the certain number (or density) or more) in the vicinity (or within a (distance measurement) effective distance).

(Example #6-1) When the REP_SIG for REQ_SIG transmitted by the transmitter is not received (successfully) within a preset time (or LATENCY)

(Example #6-2) When the receiver (or transmitter) requests to reselect the transmission resource to the transmitter (or receiver) (through a predefined channel (for that purpose))

As an example, the request may be performed when a distance measurement signal related sequence detection failure and/or a (transmitting together) data (or payload) demodulation/decoding failure (continuously) occurs with the predetermined threshold number (or threshold time) or more.

(Example #6-3) When the distance measurement signal transmission resource (/pool) for each (preset) geographic area (or location) is separated (e.g., TDM type), if the geographic area (or location) is changed to which the resource belongs.

As another example, when the receiver does not exist (or with the certain number (or density) or more) in the vicinity (or within the (distance measurement) effective distance) (e.g., may be checked this through a predefined channel (or message)) (e.g., CAM, DISCOVERY, etc.), the transmitter may release (and/or may not perform distance measurement signal transmission) the (previously selected/reserved) transmission resource.

For convenience of understanding, in [Proposed Method #6], an example of a method of transmitting a distance measurement signal (especially, a method of reselecting a resource) based on whether the receiver exists (or with the certain number (or density) or more) in the vicinity (or within the (distance measurement) effective distance) based on (sidelink) discovery will be described with reference to the drawings.

Figure 25:
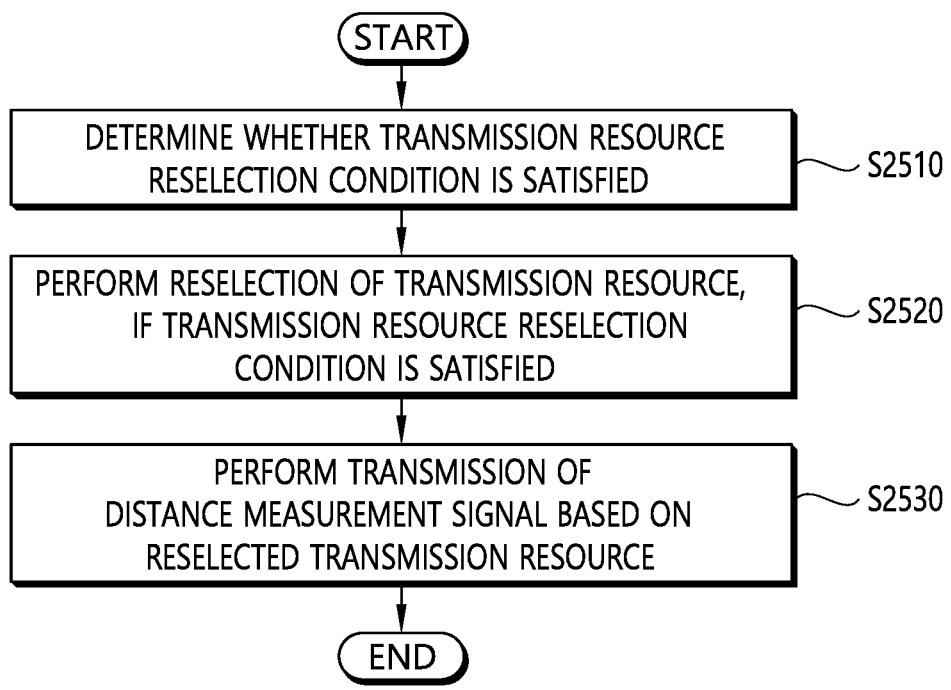
FIG. 25 is a flowchart schematically illustrating an embodiment of a method of transmitting a distance measurement signal according to another embodiment of the present disclosure.

FIG. 25 is a flowchart schematically illustrating an embodiment of a method of transmitting a distance measurement signal according to another embodiment of the present disclosure.

Referring to FIG. 25, a first UE (corresponding to a transmitter (here, the transmitter may mean a transmitter that transmits a ranging request signal or a transmitter that transmits a ranging response signal)) may determine whether a transmission resource reselection condition is satisfied (S2510).

Here, reselection of the transmission resource may be determined based on whether the receiver exists (with the certain number (or density) or more) in the vicinity (or within a (distance measurement) effective distance) based on (sidelink) discovery.

As an example, a transmission resource (re)selection/reservation operation may be performed (limitedly) only when a wireless communication device exists (with the certain number (or density) or more) in the vicinity (or within a (distance measurement) effective distance).

When the receiver does not exist (or with the certain number (or density) or more) in the vicinity (or within the (distance measurement) effective distance) (e.g., may check this through a predefined channel (or message)) (e.g., CAM, DISCOVERY, etc.), and the transmitter may release (and/or may not perform distance measurement signal transmission) the (previously selected/reserved) transmission resource.

Thereafter, if the transmission resource reselection condition is satisfied, the first UE may perform reselection of the transmission resource (S2520). Here, the transmission resource reselection condition is described in detail in the above-described examples and thus repeated descriptions thereof are omitted.

Thereafter, the first UE may perform transmission of the distance measurement signal based on the reselected transmission resource (S2530). Here, a specific example in which the UE performs distance measurement signal transmission is the same as that described above and thus repeated descriptions thereof are omitted.

[Proposed Method #7]

As an example, an REP_SIG (e.g., may be interpreted as a kind of feedback channel) resource linked to one (or multiple) REQ_SIG (resources) may be set (allowed) to the plural number.

Here, as an example, the rule considers a situation in which several receivers, having received (one) REQ_SIG transmitted by the transmitter reply (/respond).

Here, as an example, a plurality of REP_SIG resources linked to one REQ_SIG (resource) may be set in an FDM form in order to reduce LATENCY of various receiver related distance measurement operations (completion).

Here, as an example, when the number (or density) of target receivers (or within the vicinity or (distance measurement) effective distance) is (approximately) determined through a predefined channel (or message) (e.g., CAM, DISCOVERY, etc.), an amount (or number) of REP_SIG resources may enable the (transmitter) to adjust based on this (e.g., if the target receiver density is high, a relatively large amount of REP_SIG resource (or number) may be allocated).

Here, as an example, according to a method in which the REP_SIG resource amount (or number) is set, the number of receivers varies in which the transmitter allows (/intends) to receive REP_SIG.

Here, as another example, when a predefined specific (type) wireless communication device (e.g., RSU, eNB) performs to adjust (or reset) the amount (or number) of REP_SIG resources, the UE (or transmitter/receiver) may report the estimated number of target receivers (or density) information (within the vicinity or (distance measurement) effective distance) information through a predefined channel (for that purpose).

Here, as an example, updated REP_SIG resource information may be (broadcast) signaled (from a transmitter or a specific (type) wireless communication device) to a wireless communication device (e.g., (peripheral) receiver) (and/or (transmitter)) through a predefined (channel for that purpose).

Here, as an example, other wireless communication devices (e.g., UEs, RSUs, etc.) (within the vicinity or (distance measurement) effective distance) may notify the need to increase or decrease the amount (or the number) of REP_SIG resources (to the transmitter) through a predefined channel (for that purpose).

As another example, when the transmitter, having sent the REQ_SIG enables only some receivers (e.g., designated (one) receiver) to reply (/response) to the REP_SIG, (at least) (distance measurement or response) target receiver (GROUP) ID information may be included (as described in the [proposed method #3]) on REQ_SIG (or a predefined channel (of the purpose)).

As another example, (multiple) REQ_SIG (or REP_SIG) resources on different time points may be linked (/linkage) to REP_SIG (or REQ_SIG) resource(s) on a specific time point (or relatively few time points) (e.g., for FDM (or TDM) transmission of REP_SIG).

Previously, various methods related to the distance measurement signal were described. In this case, because examples of the above-described proposed method may be included as one of implementation methods of the present disclosure, it is obvious that the examples may be regarded as a kind of proposed methods.

Further, the above-described proposed methods may be implemented independently, but may be implemented in a combination (or merge) form of some proposed methods.

As an example, the present disclosure has described the proposed method based on a 3GPP LTE system for convenience of description, but the range of the system to which the proposed method is applied may be extended to other systems in addition to the 3GPP LTE system.

As an example, (some) proposed methods of the present disclosure may be applied in an extended manner for D2D communication.

Here, as an example, D2D communication means that the UE communicates with another UE using a direct radio channel, and here, as an example, the UE means a user's UE, but network equipment such as an eNB may be regarded as a kind of UE when transmitting/receiving a signal according to a communication method between UEs.

As an example, (some) proposed methods of the present disclosure are not limited to direct communication between UEs, and may be used in uplink or downlink, and in this case, an eNB or a relay node may use the proposed method.

As an example, information on whether to apply the proposed methods of the present disclosure (or information on rules of the proposed methods) may be defined to enable the eNB to notify the UE or to enable the transmitting UE to notify the receiving UE through a predefined signal (e.g., physical layer signal or higher layer signal).

For example, (some) proposed methods of the present disclosure may be limitedly applied only to a MODE #3 operation (e.g., a mode in which the eNB signals (/controls) scheduling information related to V2X message transmission (/reception)) and/or a MODE #4 operation (e.g., a mode in which the UE (independently) determines (/controls) V2X message transmission (/reception)) related scheduling information.

Hereinafter, a wireless communication device according to an embodiment of the present disclosure will be described.

Figure 26:
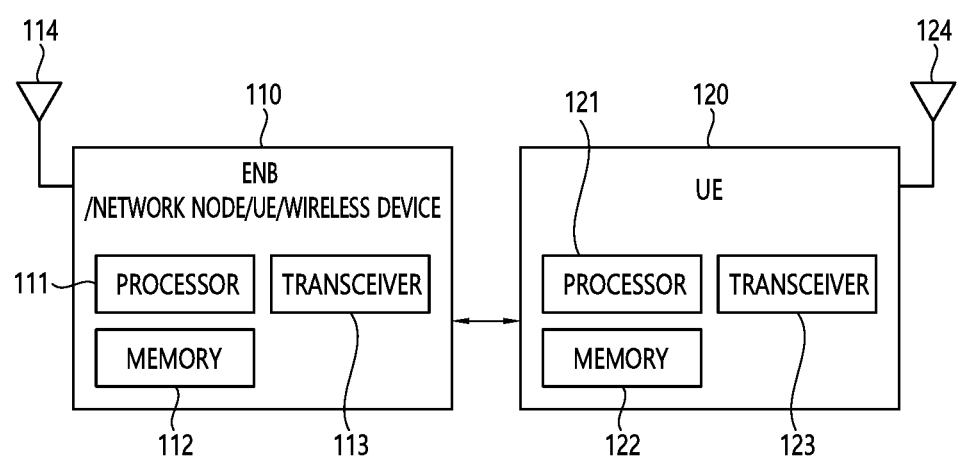
FIG. 26 is a block diagram illustrating an example of a wireless communication device according to an embodiment of the present disclosure.

FIG. 26 is a block diagram illustrating an example of a wireless communication device according to an embodiment of the present disclosure.

Referring to the example of FIG. 26, a wireless communication system may include an eNB 110 and a UE 120. The UE 120 may be located within an area of the eNB 110. In some scenarios, the wireless communication system may include a plurality of UEs. In the example of FIG. 26, the eNB 110 and the UE 120 are illustrated, but the present disclosure is not limited thereto. For example, the eNB 110 may be replaced with another network node, UE, wireless device, or the like.

The eNB and the UE may each be represented by a wireless communication device or a wireless device. The eNB in FIG. 26 may be replaced with a network node, wireless device, or UE.

The eNB 110 includes at least one processor such as a processor 111, at least one memory such as a memory 112, and at least one transceiver such as a transceiver 113. The processor 111 performs the above-described functions, procedures, and/or methods. The processor 111 may perform one or more protocols. For example, the processor 111 may perform one or more layers (e.g., functional layer) of a radio interface protocol. The memory 112 is connected to the processor 111 and stores various types of information and/or commands. The transceiver 113 may be connected to the processor 111 and be controlled to transmit and receive wireless signals.

The UE 120 includes at least one processor such as a processor 121, at least one memory device such as a memory 122, and at least one transceiver such as a transceiver 123.

The processor 121 performs the above-described functions, procedures, and/or methods. The processor 121 may implement one or more protocols. For example, the processor 121 may implement one or more layers (e.g., functional layer) of a radio interface protocol. The memory 122 is connected to the processor 121 and stores various types of information and/or commands. The transceiver 123 may be connected to the processor 121 and be controlled to transmit and receive wireless signals.

The memory 112 and/or the memory 122 may be connected to the inside or the outside of the processor 111 and/or the processor 121, respectively and be connected to other processors through various technologies such as wired or wireless connection.

The eNB 110 and/or the UE 120 may have one or more antennas. For example, an antenna 114 and/or an antenna 124 may be configured to transmit and receive wireless signals.

Figure 27:
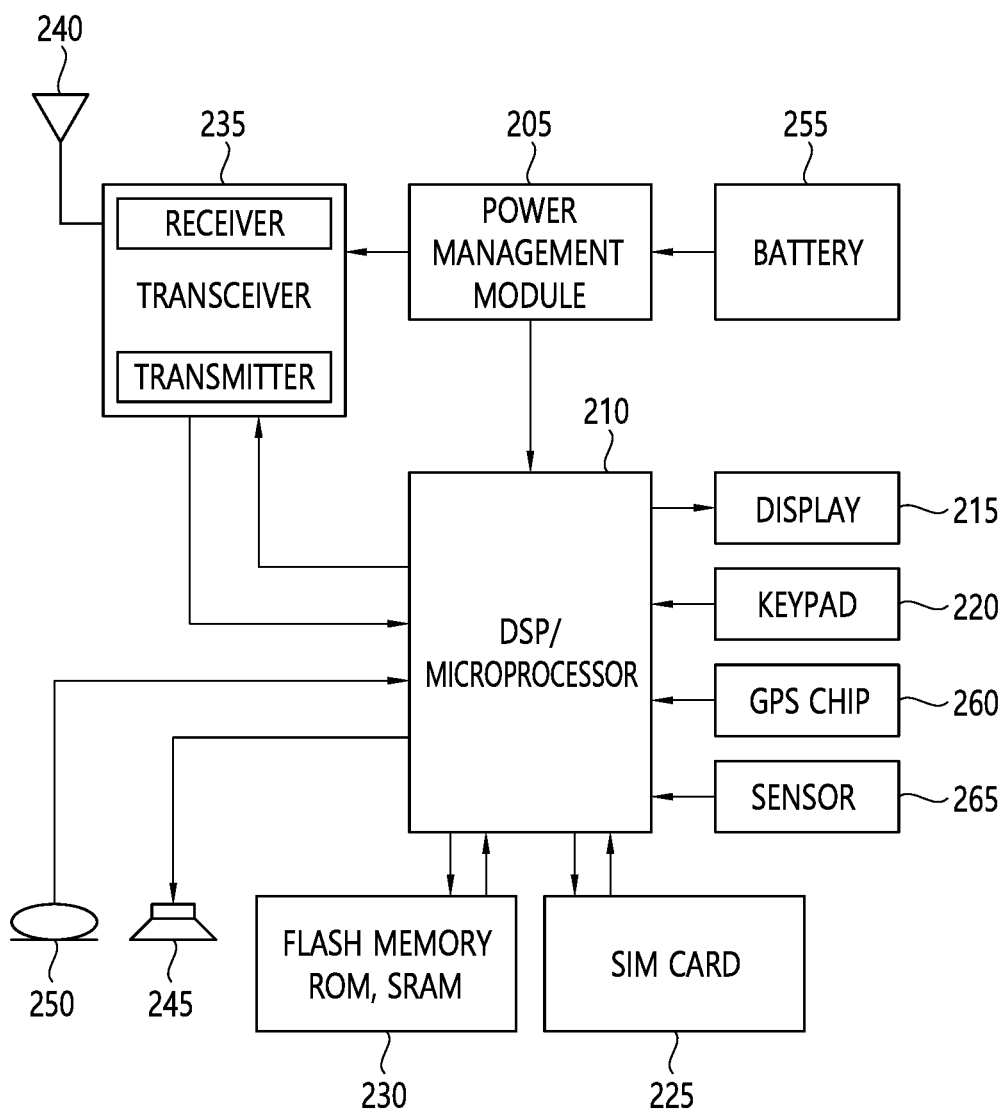
FIG. 27 shows an example of a wireless communication device in which an embodiment of the present disclosure is implemented.

FIG. 27 shows an example of a wireless communication device in which an embodiment of the present disclosure is implemented.

In particular, FIG. 27 is a diagram illustrating an example of the UE 100 of FIG. 26 in more detail. The UE may be any appropriate mobile computer device configured to perform one or more implementations of the present disclosure, such as a vehicle communication system or device, a wearable device, a portable computer, a smart phone, and the like.

Referring to the example of FIG. 27, the UE may include at least one processor (e.g., DSP or microprocessor) such as a processor 210, a transceiver 235, a power management module 205, an antenna 240, a battery 255, a display 215, a keypad 220, a satellite navigation device (GPS) chip 260, a sensor 265, a memory 230, a subscriber identification module (SIM) card 225 (which may be optional), a speaker 245, and a microphone 250. The UE may include one or more antennas.

The processor 210 may be configured to perform the above-described functions, procedures, and/or methods. According to an implementation example, the processor 210 may perform one or more protocols, such as layers of a radio interface protocol (e.g., functional layers).

The memory 230 is connected to the processor 210 and stores information related to the operation of the processor. The memory may be located inside or outside the processor, and be connected to other processors through various technologies such as a wired or wireless connection.

The user may input various types of information (e.g., command information such as a phone number) by pressing buttons of the keypad 220 or using various techniques such as voice activation using the microphone 250. The processor receives and processes the user's information and performs appropriate functions such as dialing a phone number. For example, data (e.g., operational data) may be retrieved from the SIM card 225 or the memory 230 in order to perform functions. As another example, the processor may receive and process GPS information from the GPS chip 260 in order to perform functions related to a location of the device, such as vehicle navigation device and map services. As another example, the processor may display various types of information and data on the display 215 for user reference or convenience.

The transceiver 235 is connected to the processor, and transmits and receives a radio signal such as a radio frequency (RF) signal. The processor may control the transceiver to initiate communication and to transmit wireless signals including various types of information or data, such as voice communication data. The transceiver includes one receiver and one transmitter in order to send or receive wireless signals. The antenna 240 facilitates transmission and reception of wireless signals. According to an implementation example, in receiving wireless signals, the transceiver may forward and convert the signals with a baseband frequency in order to process the signals using the processor. The processed signals may be processed according to various techniques, such as being converted into information that can be heard or read to be output through the speaker 245.

According to the implementation example, the sensor 265 may be connected to the processor. The sensor may include one or more sensing devices configured to discover various types of information including speed, acceleration, light, vibration, proximity, location, images, and the like, but not limited thereto. The processor may receive and process sensor information obtained from the sensor and perform various types of functions such as collision prevention and automatic driving.

In the example of FIG. 27, various components (e.g., camera, USB port, etc.) may be further included in the UE. For example, the camera may be connected to the processor and be used for various services such as automatic driving, vehicle safety services, and the like.

In this way, FIG. 27 is an example of a UE, and implementation is not limited thereto. For example, some components (e.g., the keypad 220, the GPS chip 260, the sensor 265, the speaker 245, and/or the microphone 250) may not be implemented in some scenarios.

Figure 28:
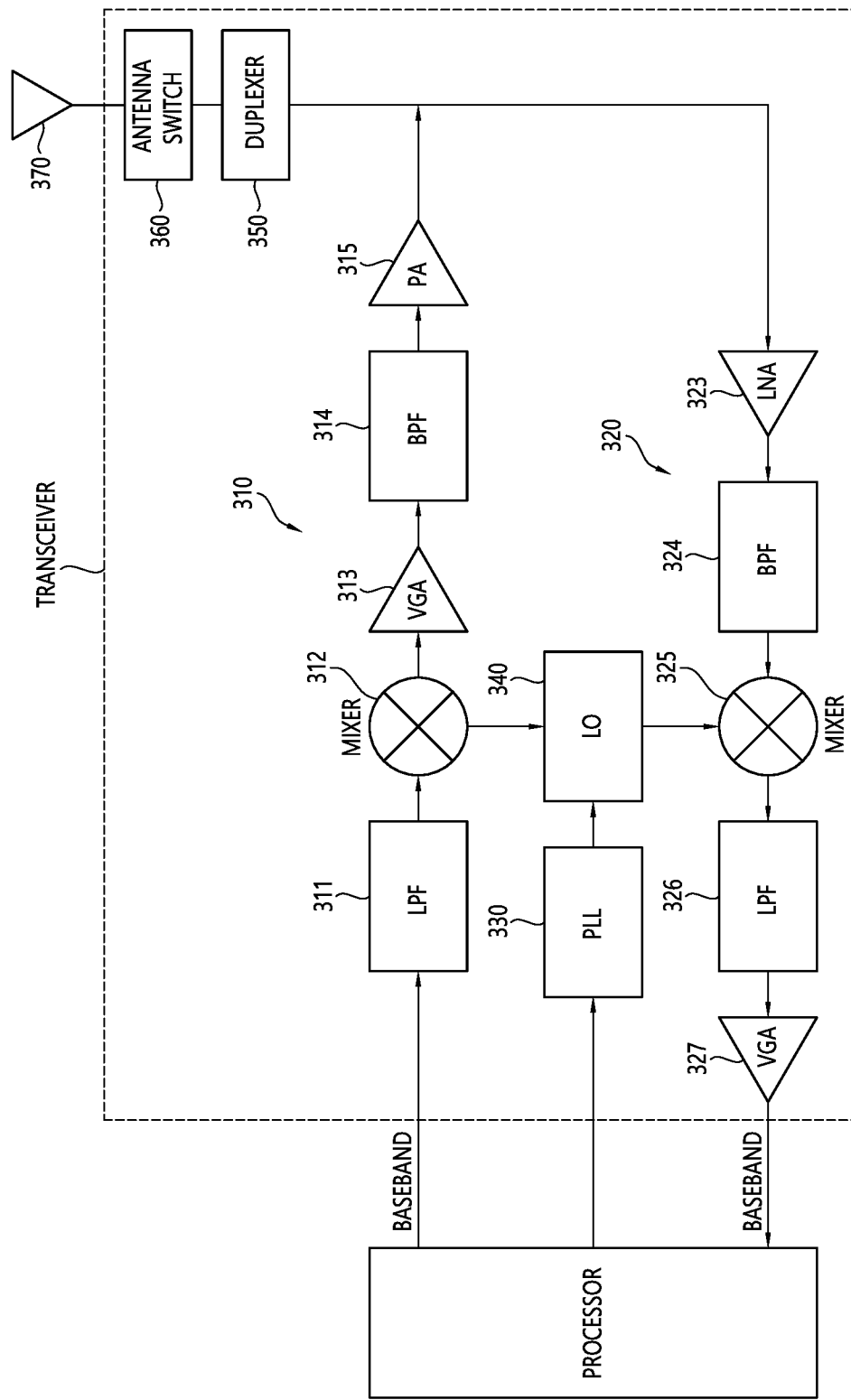
FIG. 28 shows an example of a transceiver of a wireless communication device according to an embodiment of the present disclosure.

FIG. 28 shows an example of a transceiver of a wireless communication device according to an embodiment of the present disclosure.

In particular, FIG. 28 shows an example of a transceiver that may be implemented in a frequency division duplex (FDD) system.

In a transmission path, at least one processor, such as the processors described in FIGS. 26 and 27, may process data to be transmitted and send a signal such as an analog output signal to a transmitter 310.

In the above example, the analog output signal at the transmitter 310 is filtered by a low pass filter (LPF) 311, for example, in order to remove noise due to previous digital-to-analog conversion (ADC), is up-converted by an up-converter (e.g., mixer) 312 from a baseband to an RF, and is amplified by an amplifier such as a variable gain amplifier (VGA) 313. The amplified signal is filtered by a filter 314, is amplified by a power amplifier (PA) 315, is routed through a duplexer(s) 350/antenna switch(s) 360, and is transmitted through an antenna 370.

In the reception path, the antenna 370 receives signals in a wireless environment, and the received signals are routed at the antenna switch(s) 360/duplexer(s) 350 and are sent to a receiver 320.

In the above example, a signal received at the receiver 320 is amplified by an amplifier such as a low noise amplifier (LNA) 323, is filtered by a band pass filter 324, and is down-converted by a down-converter 325 (e.g., mixer) from the RF to the baseband.

The down-converted signal is filtered by a low pass filter (LPF) 326 and is amplified by an amplifier such as a VGA 327 in order to obtain an analog input signal, and the analog input signal is provided to one or more processors, such as the processor in FIGS. 26 and 27.

Furthermore, a local oscillator (LO) 340 generates transmission and reception of an LO signal and sends the LO signal to each of the up-converter 312 and the down-converter 325.

In some implementations, a phase locked loop (PLL) 330 may receive control information from the processor and send control signals to the LO 340 in order to generate transmission and reception of LO signals at an appropriate frequency.

Implementations are not limited to a particular disposition illustrated in FIG. 28, and various components and circuits may be disposed differently from the example illustrated in FIG. 27.

Figure 29:
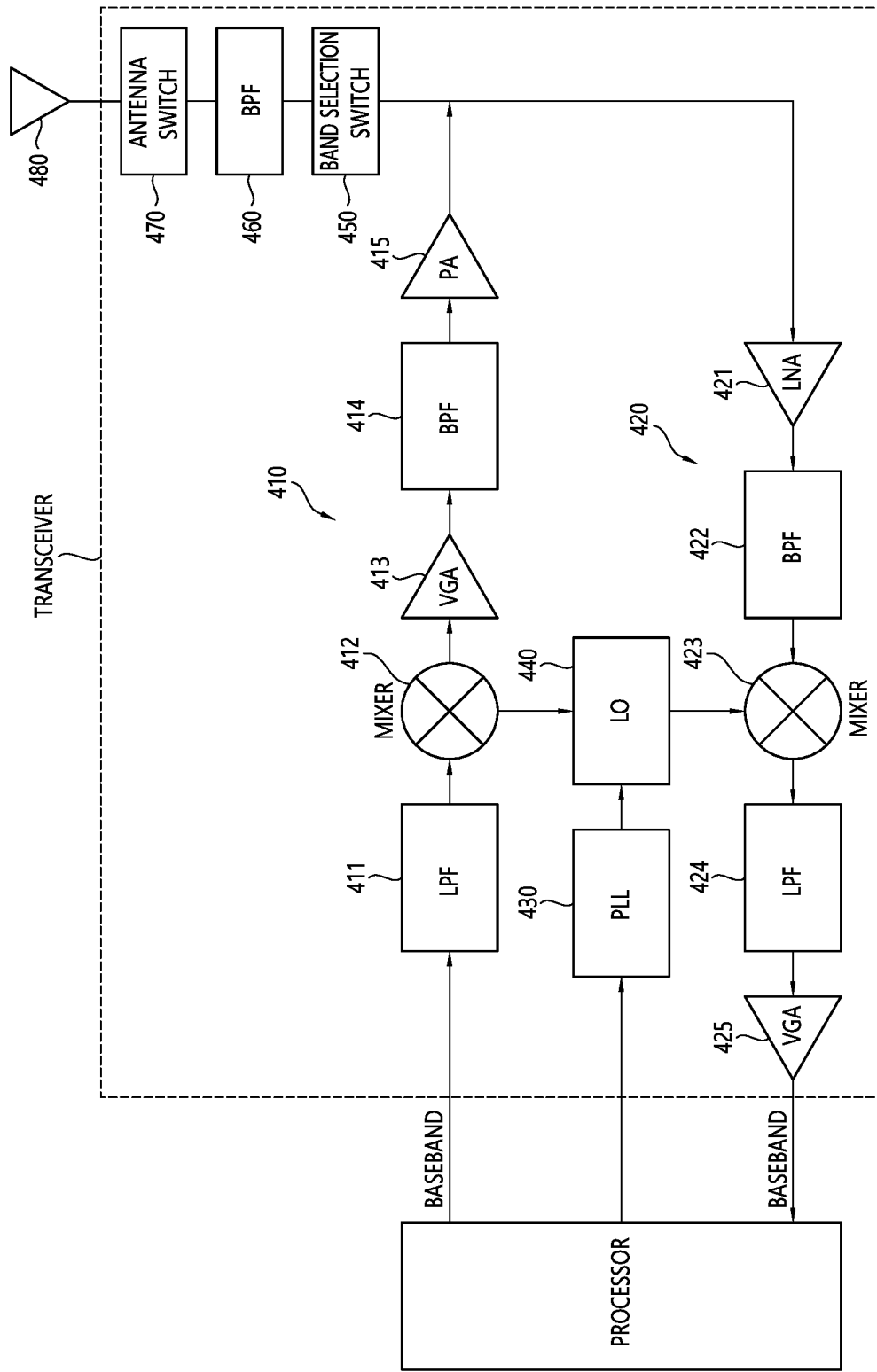
FIG. 29 shows another example of a transceiver of a wireless communication device according to an embodiment of the present disclosure.

FIG. 29 shows another example of a transceiver of a wireless communication device according to an embodiment of the present disclosure.

In particular, FIG. 29 shows an example of a transceiver that can be implemented in a time division duplex (TDD) system.

According to the implementation example, a transmitter 410 and a receiver 420 of the transceiver of the TDD system may have one or more similar characteristics to that of a transmitter and a receiver of a transceiver of an FDD system.

Hereinafter, a structure of the transceiver of the TDD system will be described.

In a transmission path, a signal amplified by a power amplifier (PA) 415 of the transmitter is routed through a band selection switch 450, a band pass filter (BPF) 460, and an antenna switch(s) 470 and is transmitted to an antenna 480.

In a reception path, the antenna 480 receives signals from a wireless environment, and the received signals are routed through the antenna switch(s) 470, the BPF 460, and the band selection switch 450 and are provided to the receiver 420.

Figure 30:
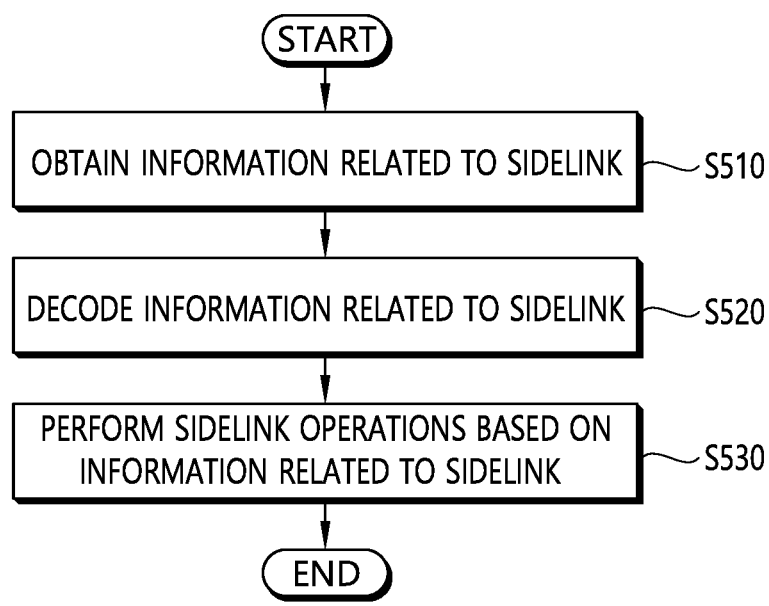
FIG. 30 shows an example of an operation of a wireless device related to sidelink communication.

FIG. 30 shows an example of an operation of a wireless device related to sidelink communication. An operation of the wireless device related to the sidelink described in FIG. 30 is merely an example, and sidelink operations using various technologies may be performed in the wireless device. The sidelink is a UE-to-UE interface for sidelink communication and/or sidelink discovery. The sidelink may correspond to a PC5 interface. In a broad sense, a sidelink operation may be transmission and reception of information between UEs. The sidelink may carry various types of information.

In the above example, the wireless device obtains information related to the sidelink (S510). The information related to the sidelink may be one or more resource configurations. Sidelink related information may be obtained from other wireless devices or network nodes.

After obtaining information, the wireless device decodes the information related to the sidelink (S520).

After decoding the information related to the sidelink, the wireless device performs one or more sidelink operations based on the information related to the sidelink (S530). Here, the sidelink operation(s) performed by the wireless device may be one or more operations described in the present disclosure.

Figure 31:
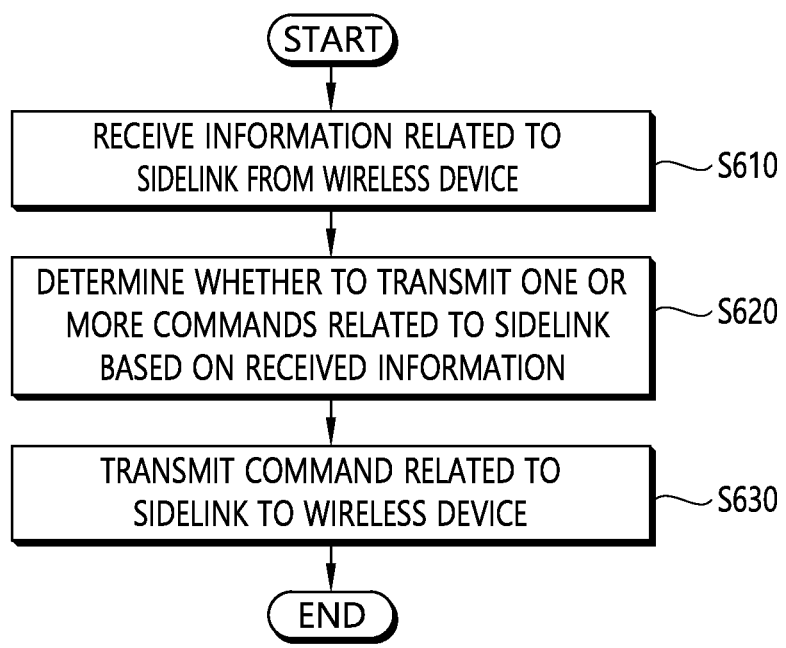
FIG. 31 shows an example of operation of a network node related to a sidelink.

FIG. 31 shows an example of operation of a network node related to a sidelink. The network node operation related to the sidelink described in FIG. 31 is merely an example, and sidelink operations using various technologies may be performed at the network node.

The network node receives information related to the sidelink from the wireless device (S610). For example, the information related to the sidelink may be "SidelinkUEInformation" used for notifying the network node of the sidelink information.

After receiving the information, the network node determines whether to transmit one or more commands related to the sidelink based on the received information (S620).

According to determination of the network node to transmit the command, the network node transmits a command(s) related to the sidelink to the wireless device (S630). According to an implementation example, after receiving a command sent by the network node, the wireless device may perform one or more sidelink operation(s) based on the received command.

Figure 32:
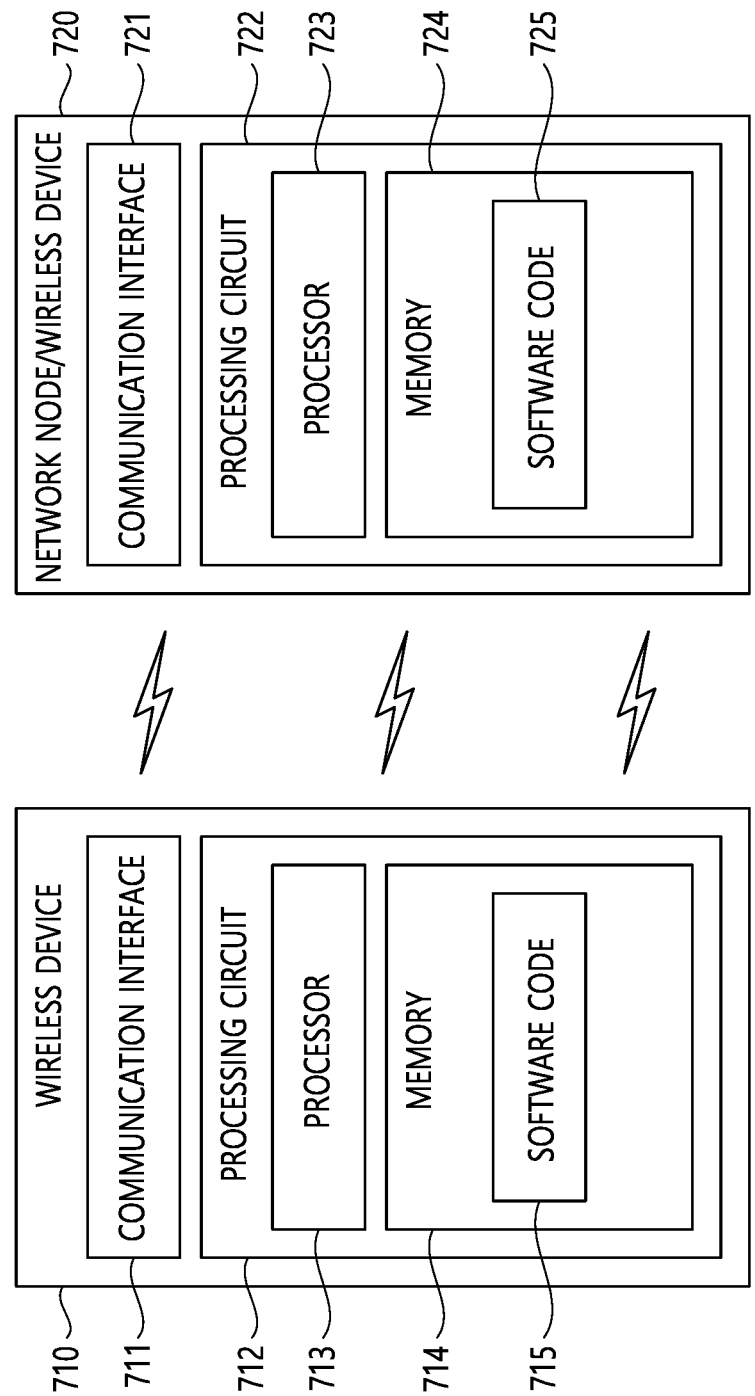
FIG. 32 is a block diagram illustrating an example of communication between a wireless device 710 and a network node 720.

FIG. 32 is a block diagram illustrating an example of communication between a wireless device 710 and a network node 720. The network node 720 may be replaced by the above-described wireless device or UE.

In the above example, in order to communicate with one or more other wireless devices, network nodes and/or other elements within the network, the wireless device 710 includes a communication interface 711. The communication interface 711 may include one or more transmitters, one or more receivers, and/or one or more communication interfaces. The wireless device 710 includes a processing circuit 712. The processing circuit 712 may include one or more processors such as a processor 713 and one or more memories such as a memory 714.

The processing circuit 712 may be configured to control any of the methods and/or processes described in the present disclosure and/or, for example, to enable the wireless device 710 to perform such a method and/or process. The processor 713 corresponds to one or more processors for performing wireless device functions described in the present disclosure. The wireless device 710 includes a memory 714 configured to store data, program software code, and/or other information described in the present disclosure.

In one or more implementations, when one or more processors, such as the processor 713, are executed, the memory 714 is configured to store a software code 715 including commands that enable the processor 713 to perform some or all of the processes discussed in detail in connection with the implementation examples discussed in the present disclosure.

For example, in order to transmit and receive information, as in the processor 713, one or more processors that control one or more transceivers, such as the transceiver 123 of FIG. 26, may perform one or more processes related to transmission and reception of information.

The network node 720 includes a communication interface 721 in order to communicate with one or more other network nodes, wireless devices and/or other elements on the network. Here, the communication interface 721 includes one or more transmitters, one or more receivers, and/or one or more communication interfaces. The network node 720 includes a processing circuit 722. Here, the processing circuit includes a processor 723 and a memory 724.

In various implementations, when executed by one or more processors, such as the processor 723, the memory 724 is configured to store a software code 725 including commands that enable the processor 723 to perform some or all of the processes discussed in detail in connection with the implementation examples discussed in the present disclosure.

For example, in order to transmit and receive information, as in the processor 723, one or more processors that control one or more transceivers, such as the transceiver 113 of FIG. 26, may perform one or more processes related to transmission and reception of information.

What is claimed is:

1. A method of transmitting a ranging response signal performed by a first vehicle-to-X (V2X) user equipment (UE) for supporting distance measurement in a wireless communication system, the method comprising:
   receiving a ranging request signal from a second V2X UE; and
   transmitting a ranging response signal to the second V2X UE in response to the ranging request signal based on distance measurement parameter information,
   wherein the distance measurement parameter information comprises information about a cyclic prefix (CP) length used for the ranging response signal, and
   the CP length used for the ranging response signal is different from a CP length used for V2X data channel transmission.

2. The method of claim 1, wherein a phase based on the ranging request signal and the ranging response signal is used, when the distance measurement is performed.

3. The method of claim 1, wherein the distance measurement parameter information comprises at least one of sensing operation related information, transmission power related information, resource pool related information, or congestion control based link adaption related information.

4. The method of claim 1, wherein the distance measurement parameter information is transmitted from a base station through predefined signaling.

5. The method of claim 1, wherein the distance measurement parameter information is determined by the first UE based on a predefined rule.

6. The method of claim 1, wherein the first V2X UE determines a transmission resource related to transmission of the ranging response signal and transmits the ranging response signal to the second V2X UE based on the determined transmission resource.

7. The method of claim 6, wherein the first V2X UE determines the transmission resource among resources except for a resource to which the ranging request signal is transmitted.

8. The method of claim 7, wherein the first V2X UE selects a resource having relatively less interference as the transmission resource based on sensing.

9. The method of claim 7, wherein information about the resource to which the ranging request signal is transmitted is included in the ranging request signal.

10. The method of claim 6, wherein the first V2X UE reselects the transmission resource based on whether a transmission resource reselection condition is satisfied.

11. The method of claim 1, wherein the ranging request signal comprises at least one of information on an ID of the second V2X UE, application ID information, or location information of the second V2X UE.

12. A first vehicle-to-X (V2X) user equipment (UE) for supporting distance measurement in a wireless communication system, the first V2X UE comprising:
a transceiver configured to transmit and receive wireless signals; and
a processor configured to control the transceiver,
wherein the processor is configured to:
receive a ranging request signal from a second V2X UE; and
transmit a ranging response signal to the second V2X UE in response to the ranging request signal based on distance measurement parameter information,
wherein the distance measurement parameter information comprises information about a cyclic prefix (CP) length used for the ranging response signal, and
the CP length used for the ranging response signal is different from a CP length used for V2X data channel transmission.

13. A method of transmitting sidelink control information (SCI) in a wireless communication system, the method performed by a first vehicle-to-X (V2X) user equipment (UE) and comprising:
transmitting, to a second V2X UE, sidelink control information (SCI) through a physical sidelink control channel (PSCCH),
wherein the SCI is used for scheduling a physical sidelink shared channel (PSSCH),
wherein the SCI includes at least one of:
priority information related to scheduling the PSSCH;
frequency information related to scheduling the PSSCH;
time information related to scheduling the PSSCH; or
modulation and coding scheme (MCS) information related to scheduling the PSSCH,
transmitting, to the second V2X UE, the PSSCH based on the SCI;
receiving a ranging request signal from the second V2X UE; and
transmitting a ranging response signal to the second V2X UE in response to the ranging request signal based on distance measurement parameter information,
wherein the distance measurement parameter information comprises information about a cyclic prefix (CP) length used for the ranging response signal, and
the CP length used for the ranging response signal is different from a CP length used for V2X data channel transmission.

* * * * *